United States Patent
Shimizu

(10) Patent No.: US 9,626,219 B2
(45) Date of Patent: Apr. 18, 2017

(54) INFORMATION PROCESSING APPARATUS, METHOD OF CONTROLLING THE SAME AND NON-TRANSITORY COMPUTER READABLE MEDIUM

(71) Applicant: CANON KABUSHIKI KAISHA, Tokyo (JP)

(72) Inventor: Yasutomo Shimizu, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/931,911

(22) Filed: Nov. 4, 2015

(65) Prior Publication Data
US 2016/0147580 A1    May 26, 2016

(30) Foreign Application Priority Data

Nov. 20, 2014 (JP) ................. 2014-235892

(51) Int. Cl.
*G06F 9/54* (2006.01)
*G06F 9/48* (2006.01)

(52) U.S. Cl.
CPC ................. *G06F 9/4843* (2013.01)

(58) Field of Classification Search
CPC ................. G06F 9/542; G06F 9/544
See application file for complete search history.

(56) References Cited

U.S. PATENT DOCUMENTS

| | | | | |
|---|---|---|---|---|
| 6,834,386 B1* | 12/2004 | Douceur | ............... | G06F 9/4881 718/102 |
| 8,180,407 B1* | 5/2012 | Kindred | ............ | H04W 52/0251 327/544 |
| 8,621,494 B2* | 12/2013 | Singh | .................... | G06F 1/3203 710/263 |
| 2005/0149932 A1* | 7/2005 | Hasink | ...................... | G06F 9/52 718/100 |
| 2014/0143791 A1* | 5/2014 | Mark | ...................... | G06F 9/485 719/318 |

FOREIGN PATENT DOCUMENTS

| | | |
|---|---|---|
| JP | 2011100475 A | 5/2011 |
| JP | 2013131818 A | 7/2013 |

* cited by examiner

*Primary Examiner* — Syed Roni
(74) *Attorney, Agent, or Firm* — Rossi, Kimms & McDowell LLP

(57) ABSTRACT

An information processing apparatus capable of executing processing in a background, comprises a control unit configured to, when processing is executed in accordance with a request from an application, control execution of other processing in the background, wherein the control unit suppresses, in accordance with the request from the application, so that the other processing is not executed in the background, and releases the suppression when, in a case where a request for release of suppression is not instructed from the application, a predetermined interval elapses from when the suppression started.

10 Claims, 17 Drawing Sheets

FIG. 4

```
package sample.applicationA;
import sample.background;

public class backgroundInhibitActivatorAppliA {
  public void backgroundInhibitAction() { backgroundInterfase.setBackgroundDisabled("AppliA", 15000, true);   ← 401
    /* execute processing, which needs to suppress BG processing, unique to an application */   ← 402
    ...
    backgroundInterfase.setBackgroundEnabled("AppliA");   ← 403

```
package sample.background;

public class backgroundInterface { public void setBackgroundDisabled (Object key, long disabledTime, Boolean    ─── 502
disabledCancelFlag) {
        backgroundInhibit.setBackgroundInhibitStatus(true, key, disabledTime,    ─── 510
disabledCancelFlag);
    }
    public void setBackgroundDisabled (Object key, long disabledTime) {          ─── 503
        setBackgroundDisabled (key, disabledTime, true);
    } public void setBackgroundEnabled (Object key) {                              ─── 504
        backgroundInhibit.setBackgroundInhibitStatus(false, key, 0, false);      ─── 511
    }
}
```

500 ⎬ (covers 502, 510, 503)
501 ⎬ (covers 504, 511)

FIG. 9A

| | 373 | 371 | 381 | 820 | 910 |
|---|---|---|---|---|---|
| 900 — bundle | LifecycleManagementService | UpdateManagementService | AppliA | LoginApplication | AppliB | ... |
| 901 — state | ACTIVE | ACTIVE | ACTIVE | ACTIVE | INSTALLED | ... |
| 902 — version | 1.0 | 1.0 | 1.31 | 1.0 | 2.03 | ... |
| ... | ... | ... | ... | ... | ... | ... |
| 903 — SystemApplicationType | SystemApplication | SystemApplication | | LoginService | | |
| 904 — MinimumConsoleSize | | | 640×400 | | | |

FIG. 9B

| | | | | | 911 |
|---|---|---|---|---|---|
| 900 — bundle | LifecycleManagementService | UpdateManagementService | AppliA | LoginApplication | AppliB | ... |
| 901 — state | ACTIVE | ACTIVE | ACTIVE | ACTIVE | STARTING | ... |
| 902 — version | 1.0 | 1.0 | 1.31 | 1.0 | 2.03 | ... |
| ... | ... | ... | ... | ... | ... | ... |
| 903 — SystemApplicationType | SystemApplication | SystemApplication | | LoginService | | |
| 904 — MinimumConsoleSize | | | 640×400 | | | |

FIG. 9C

| | | | | | 912 |
|---|---|---|---|---|---|
| 900 — bundle | LifecycleManagementService | UpdateManagementService | AppliA | LoginApplication | AppliB | ... |
| 901 — state | ACTIVE | ACTIVE | ACTIVE | ACTIVE | ACTIVE | ... |
| 902 — version | 1.0 | 1.0 | 1.31 | 1.0 | 2.03 | ... |
| ... | ... | ... | ... | ... | ... | ... |
| 903 — SystemApplicationType | SystemApplication | SystemApplication | | LoginService | | |
| 904 — MinimumConsoleSize | | | 640×400 | | | |

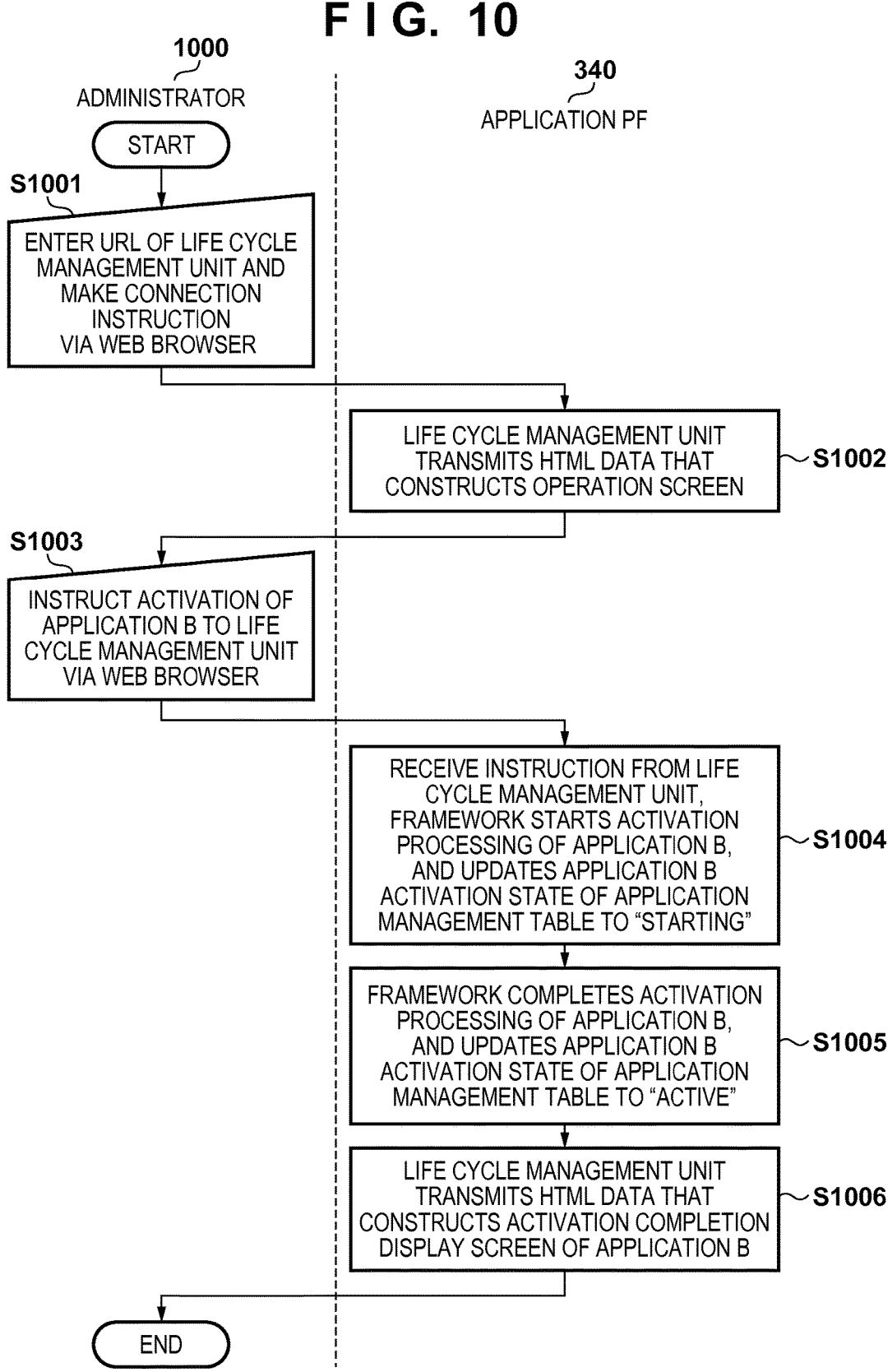

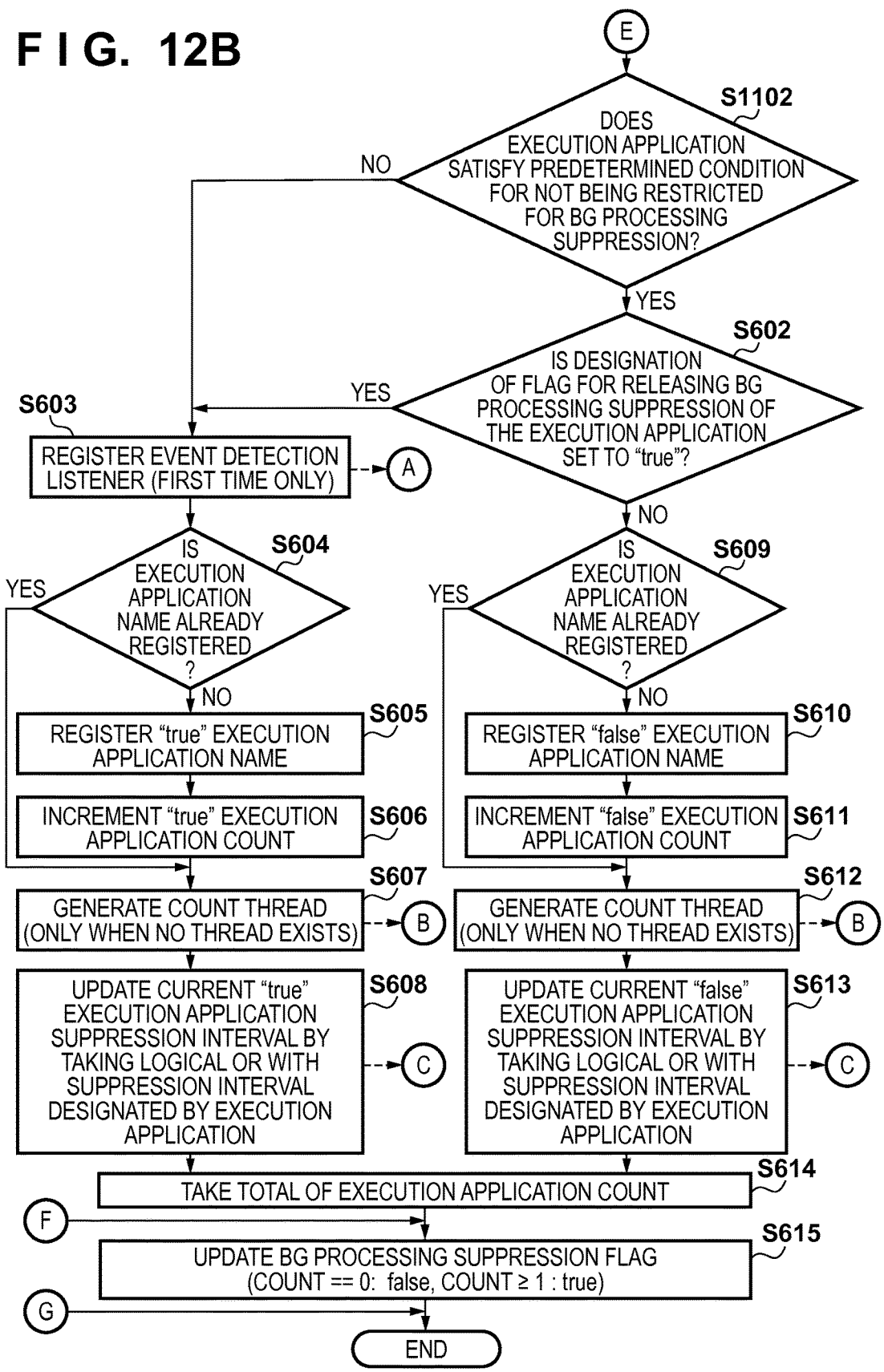

INFORMATION PROCESSING APPARATUS, METHOD OF CONTROLLING THE SAME AND NON-TRANSITORY COMPUTER READABLE MEDIUM

BACKGROUND OF THE INVENTION

Field of the Invention

The present invention relates to an information processing apparatus, a method of controlling the same, and a non-transitory computer readable medium.

Description of the Related Art

In recent years, in image processing apparatuses, there exist those that cause a comprised program to execute in the background. For example, in Japanese Patent Laid-Open No. 2013-131818, when it is determined that a long time is required for execution of instructed processing, a warning to that effect, and a message querying as to whether or not to execute a logout towards a user who is logged in is displayed on an image forming apparatus. When execution of the logout is selected by the user, the image processing apparatus causes the user to log out, and executes the instructed processing as background processing. With this, even in a case where the instructed processing requires a long time, the image processing apparatus can execute the processing after the user has performed the logout.

Meanwhile, image processing apparatuses generally comprise an application platform that causes various functions such as those of a scanner, a printer, or the like, to operate in units of applications. Applications that operate on an application platform, and background processing that the image processing apparatus executes are multitasked and executed in parallel by the image processing apparatus. For this reason, when the image processing apparatus performs processing using a CPU as background processing, there is a performance degradation such as a degradation in operationally of an application that provides a UI screen displayed on an operation screen on the image processing apparatus, for example.

Accordingly, in Japanese Patent Laid-Open No. 2011-100475, control is performed so that in a case where an application for which background processing cannot be executed is activated, the background processing is suspended, and in a case where applications for which background processing can be executed are activated, background processing is performed.

Japanese Patent Laid-Open No. 2011-100475 defines information as to whether or not background processing can be executed in advance for programs configuring applications, and based on this information, performs control of background processing. Meanwhile, there are cases in which an image processing apparatus falls into a state in which background processing cannot be executed when background processing execution control is performed based merely on information as to whether or not the image processing apparatus can execute it and activation statuses for applications in various execution modes. For example, in an application provided as a Web application, as long as it is being accessed from an information processing apparatus, the image processing apparatus determines the application to be activated. For this reason, when the Web application declares that background processing cannot be executed, the image processing apparatus cannot execute background processing as long as it is being accessed irrespective of whether or not a user is operating. Also, in a case of an application that displays a UI screen on an operation screen on the image processing apparatus, when processing is stopped in an activated state due to an application malfunction, the image processing apparatus continues to suppress the background processing. In such a case, the image processing apparatus becomes unable to execute the background processing as long as the application is not terminated forcibly.

SUMMARY OF THE INVENTION

The present invention, in view of the above described problems, performs more appropriate control for suppression of background processing.

According to one aspect of the present invention, there is provided an information processing apparatus capable of executing processing in a background, comprising a control unit configured to, when processing is executed in accordance with a request from an application, control execution of other processing in the background, wherein the control unit suppresses, in accordance with the request from the application, so that the other processing is not executed in the background, and releases the suppression when, in a case where a request for release of suppression is not instructed from the application, a predetermined interval elapses from when the suppression started.

According to another aspect of the present invention, there is provided a method of controlling an information processing apparatus capable of executing processing in a background, the method comprising a control step of, when processing is executed in accordance with a request from an application, controlling execution of other processing in the background, wherein in the control step suppression is performed, in accordance with the request from the application, so that the other processing is not executed in the background, and the suppression is released when, in a case where a request for release of suppression is not instructed from the application, a predetermined interval elapses from when the suppression started.

According to another aspect of the present invention, there is provided a non-transitory computer readable medium storing a program for causing a computer to function as a control unit configured to, when processing is executed in accordance with a request from an application, control execution of other processing in the background, wherein the control unit suppresses, in accordance with the request from the application, so that the other processing is not executed in the background, and releases the suppression when, in a case where a request for release of suppression is not instructed from the application, a predetermined interval elapses from when the suppression started.

By virtue of the present invention, it becomes possible to suppress an influence of background processing, and cause an application to operate stably. Also, it becomes possible to avoid a state in which the execution of background processing is suppressed more than is necessary.

Further features of the present invention will become apparent from the following description of exemplary embodiments (with reference to the attached drawings).

BRIEF DESCRIPTION OF THE DRAWINGS

FIG. 4 is a view for showing an example of a program according to the first embodiment.

FIG. 5 is a view for showing an example of a definition of APIs according to the first embodiment.

FIGS. 9A, 9B and 9C are views for illustrating an example configuration of an application management table according to the second embodiment.

FIG. 10 is a flowchart according to the second embodiment.

FIGS. 12A and 12B are flowcharts according to a third embodiment.

DESCRIPTION OF THE EMBODIMENTS

Hereinafter, embodiments for working the present invention are explained using drawings. Note that in the following explanation, background is recited as "BG", and platform is recited as "PF".

First Embodiment

[System Configuration]

Figure 1:
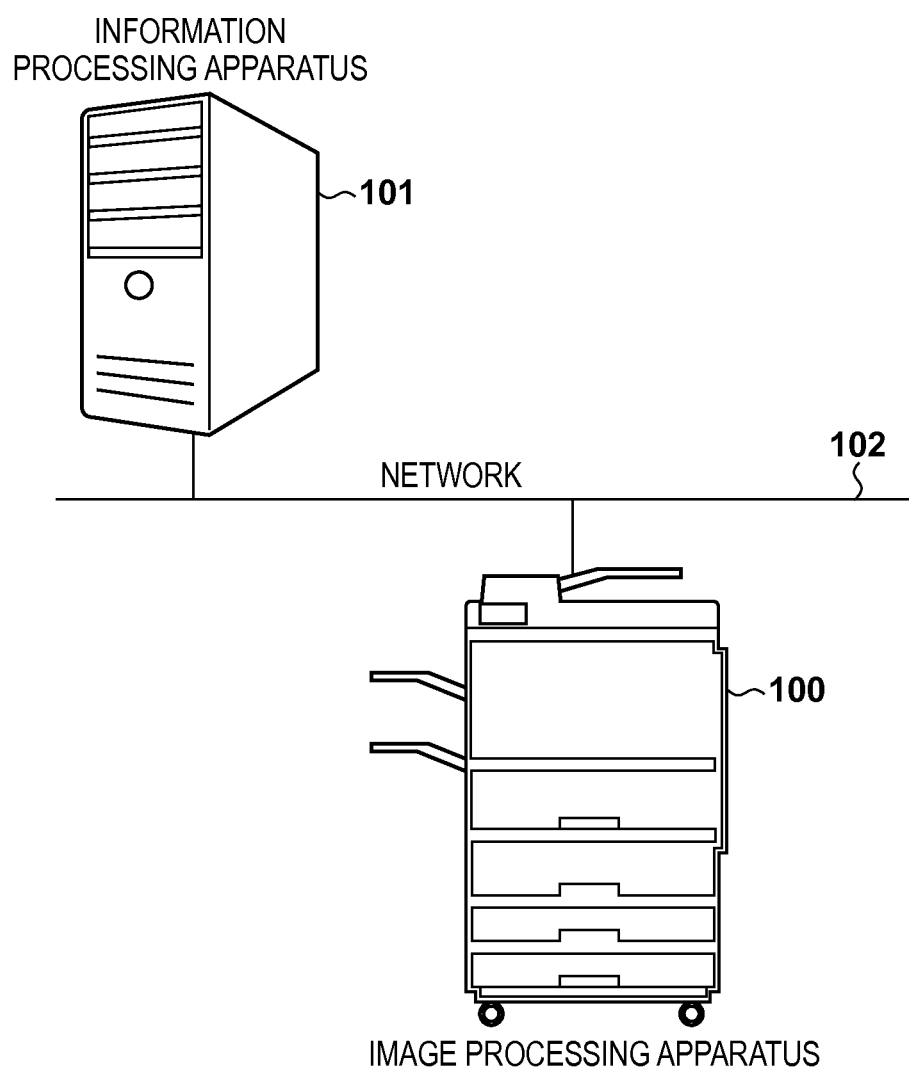
FIG. 1 is a view of an example configuration of a system according to a first embodiment.
Figure 2:
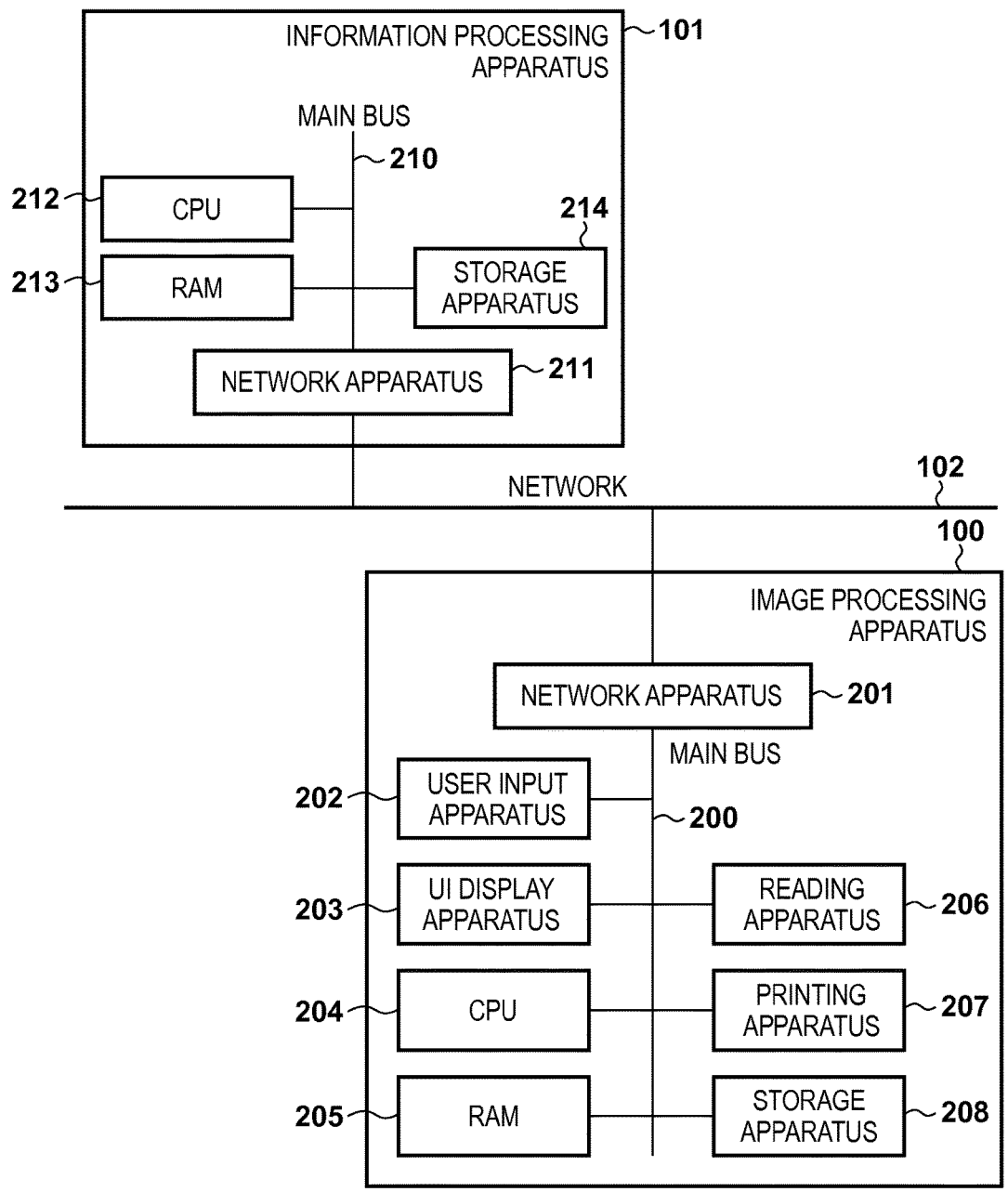
FIG. 2 is a view of a hardware configuration example of each apparatus according to the first embodiment.
Figure 3:
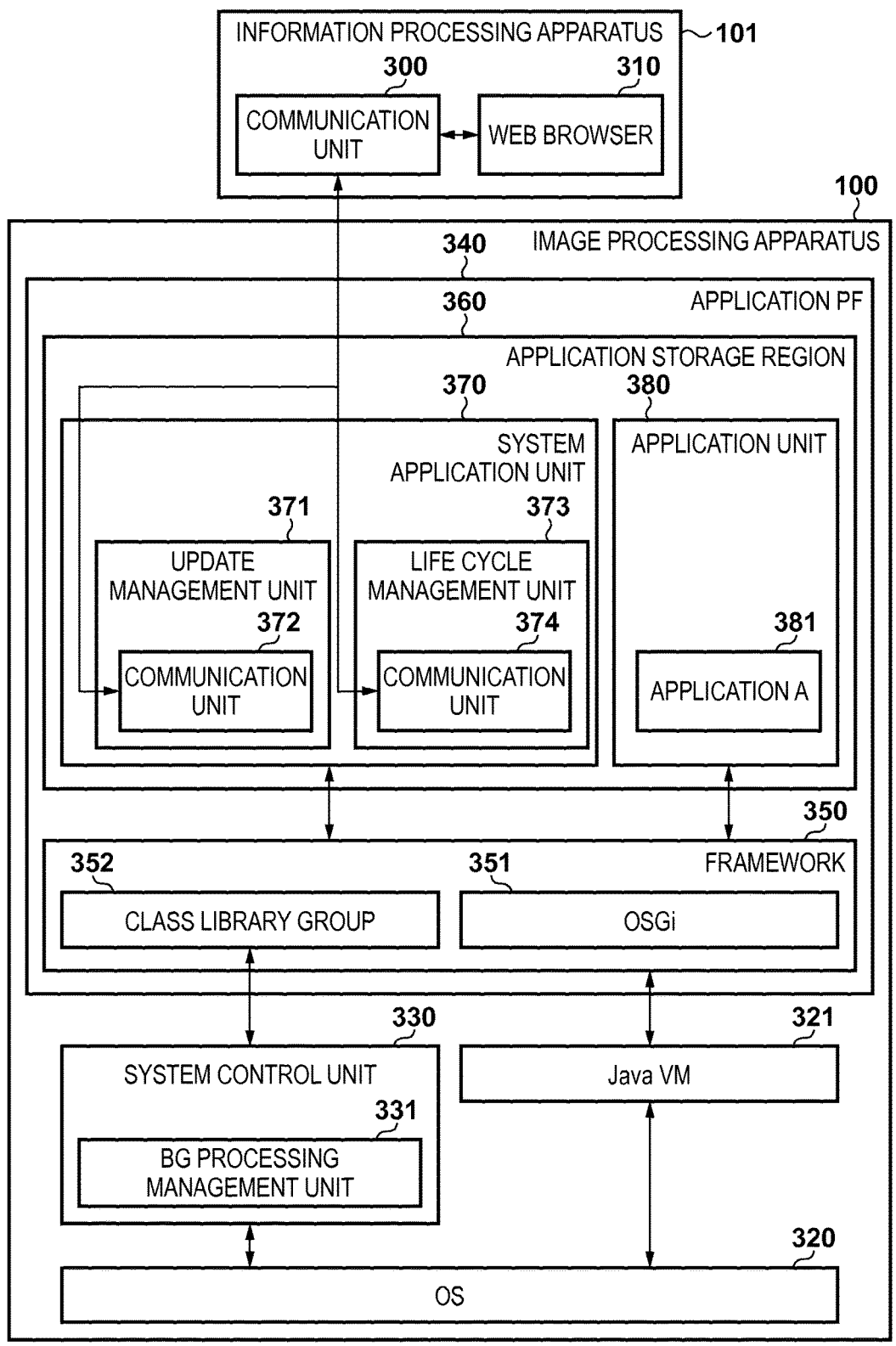
FIG. 3 is a view of a software configuration example of each apparatus according to the first embodiment.

Explanation is given of a system configuration of the present embodiment using FIG. 1 to FIG. 3.

FIG. 1 illustrates an overall system example configuration according to the present embodiment. In the present system, an image processing apparatus 100 and an information processing apparatus 101 are connected communicably via a network 102. The image processing apparatus 100 is an information processing apparatus comprising various image processing functions, such as an image forming function, an image reading function, and an image transmission function. Note that the image processing apparatus 100 may be an MFP (Multi Function Peripheral) that realizes a plurality of functions of a printer, a copy, a fax, a scanner, or the like, within one housing, and is not particularly limited. The information processing apparatus 101 is an information processing apparatus such as a PC (Personal Computer), a mobile terminal, or the like, which is capable of performing remote operation of the image processing apparatus 100 via a Web browser.

FIG. 2 illustrates an example configuration of hardware of the image processing apparatus 100 and the information processing apparatus 101 in the present embodiment. The image processing apparatus 100 comprises a network apparatus 201 for performing communication with the information processing apparatus 101, a user input apparatus 202, such as a keyboard, for accepting user operations, and a UI display apparatus 203, such as a liquid crystal display, for displaying operation screens.

Furthermore, the image processing apparatus 100 comprises a CPU 204 for controlling the apparatus on the whole, a RAM 205 that can be used as a work space, a reading apparatus 206 for reading an image original, a printing apparatus 207 for performing print operations, and a storage apparatus 208 for storing various control programs. Each portion comprised in the image processing apparatus 100 is connected by a main bus 200, and mutual transmission/reception of data is possible. Note that the user input apparatus 202 and the UI display apparatus 203 are recited as being separate apparatuses, but an operation unit in which these apparatuses are in a single body may be provided.

The information processing apparatus 101 comprises a network apparatus 211 for performing communication with external apparatuses, a CPU 212 for controlling the apparatus on the whole, a RAM 213 that can be used as a work space, and a storage apparatus 214 for storing control programs. Also, each portion comprised in the information processing apparatus 101 is connected by a main bus 210, and mutual transmission/reception of data is possible.

FIG. 3 illustrates an example configuration of software of the image processing apparatus 100 and the information processing apparatus 101 in the present embodiment. Each of the functional units illustrated in FIG. 3 is realized by the CPUs 204 and 212 that are comprised in the image processing apparatus 100 and the information processing apparatus 101 respectively reading control programs stored in the storage apparatuses 208 and 214 into the RAMs 205 and 213 and executing them.

Firstly, explanation will be given software that the information processing apparatus 101 is provided with. The information processing apparatus 101 comprises a communication unit 300 and a Web browser 310. The communication unit 300 is software for performing HTTP (Hyper Text Transfer Protocol) communication by controlling the network apparatus 211. The Web browser 310 displays operation screens (not shown) provided by an application such as an update management unit 371, a life cycle management unit 373, or the like, of the image processing apparatus 100 via the communication unit 300. Also, the Web browser 310 transmits to the image processing apparatus 100 via the communication unit 300 input information from the user which is input through a displayed operation screen. Note that in the present embodiment, the Web browser 310 is used for communication with the image processing apparatus 100, but it is sufficient that there be a software configuration that supports a protocol for communication with applications, and limitation is not made to this.

Next, explanation will be given for software that the image processing apparatus 100 is provided with. The image processing apparatus 100 comprises an OS (Operating System) 320, a Java VM 321, a system control unit 330, and an application PF 340. The OS 320 executes management of processes, memory management, and input/output management. The Java VM 321 is a virtual machine for executing Java (registered trademark) programs, and is an execution base for the application PF 340.

The system control unit 330 is a program for realizing basic functions of the image processing apparatus 100 such as copy, and comprises a BG processing management unit 331. The BG processing management unit 331 queries as to whether another process such as that of the application PF 340 has set a BG processing suppression flag (that is, whether or not the BG processing suppression flag is "true") when an execution instruction of a process that is defined in advance to be for BG processing is received. Details of the BG processing control flag will be explained later. If, for all of the other processes, the BG processing suppression flag is not "true", the BG processing management unit 331 instructs the execution of the BG processing for a corresponding process. If the BG processing suppression flag is "true" for even one of the other processes, the BG processing management unit 331 does not instruct the execution of the BG processing, and a state of waiting for the release of the BG processing suppression flag is entered. The BG processing management unit 331 confirms the status of the BG processing suppression flag in other processes periodically, and waits to execute the BG processing until the BG processing suppression flag becomes "false" for all other processes. Also, the BG processing management unit 331 also confirms the state of the BG processing suppression flag of other processes periodically after the execution of the BG processing is instructed for a corresponding process. Then, when it is detected that the BG processing suppression flag newly becomes "true" in another process during execution of the BG processing, the BG processing management unit 331 makes an instruction for the interruption of the execution of the BG processing to the corresponding process, and a state of waiting for the release of the BG processing suppression flag is entered.

The application PF 340 is an execution foundation capable of executing applications that control the image processing apparatus 100 via control APIs (Application Programming Interfaces). The application PF 340 comprises a framework 350 and an application storage region 360. The framework 350 comprises an OSGi (Open Services Gateway initiative; registered trademark) 351 for performing application life cycle management, dependency relationship management, or the like, and a class library group 352 that constitutes a platform. For the life cycle management, the dependency relationship management, and the like, conventional technology is used, and so detailed explanation here is omitted. The application storage region 360 stores applications that are saved in the storage apparatus 208, and managed on the framework 350. The application storage region 360 comprises a system application unit 370 and an application unit 380.

The system application unit 370 is comprised of an application group for providing functions constituting the application PF 340. The system application unit 370 comprises the update management unit 371 and the life cycle management unit 373. The update management unit 371 is an application for instructing the system control unit 330 via the framework 350 to update firmware written to the storage apparatus 208. The life cycle management unit 373 is an application for outputting an instruction to the framework 350, and performing life cycle management of applications on the application storage region 360. Also, the update management unit 371 and the life cycle management unit 373 provide an operation unit (not shown) for performing application operations, and receive application operation instruction by HTTP communication from the information processing apparatus 101 via the network apparatus 201 by a communication unit 372 and a communication unit 374. In the present embodiment, the update management unit 371 and the life cycle management unit 373 are explained as Java Servlet Web applications, but as long as they provide an operation unit for communication with the information processing apparatus 101, limitation is not made to this.

The application unit 380 is comprised by an application for controlling the image processing apparatus 100. In the present embodiment, the application unit 380 comprises an application A 381 which is an application for controlling the image processing apparatus 100. Also, the application A 381 comprises a function for executing a BG processing suppression API provided by the application PF 340 when control of the image processing apparatus 100 is instructed.

Explanation is given for a method of executing the BG processing suppression instruction by the application A 381, a configuration of the BG processing suppression API that the application PF 340 provides, and a BG processing suppression instruction method in the present embodiment using FIG. 4 to FIG. 6C.

In FIG. 4 the application A 381 illustrates an example of a program for making a control instruction including suppression of BG processing to the image processing apparatus 100. The application A 381 comprises a BG processing suppression processing unit (reference numeral 400) for executing a control instruction including suppression of BG processing. The reference numeral 400 comprises reference numerals 401 to 403.

The reference numeral 401 denotes a definition by which the application A 381 instructs a suppression of BG processing by executing a BG processing suppression API provided from the application PF 340. In the present embodiment, the application A 381 executes the BG processing suppression API with the application name in a first argument, "15000" in a second argument, and "true" in a third argument. Note that a definition and processing of the API will be explained later using FIG. 5, FIG. 6A, FIG. 6B, and FIG. 6C.

Reference numeral 402 is an application-specific definition by which the application A 381 instructs control of the image processing apparatus 100. In the present embodiment, it is assumed that this is processing that is influenced by a performance degradation when the image processing apparatus 100 executes BG processing, such as when processing of a response from an operation unit that provides an operation screen to the UI display apparatus 203 is performed, for example.

The reference numeral 403 denotes a definition by which the application A 381 instructs a release of a suppression of BG processing by executing a BG processing suppression release API provided from the application PF 340. In the present embodiment, the application A 381 executes the BG processing suppression release API with an application name as the first argument. Note that a definition and processing of the API will be explained later using FIG. 5, FIG. 6A, FIG. 6B, and FIG. 6C.

FIG. 5 is an example of a definition (a class) of a control instruction API for performing BG processing suppression and suppression release in the image processing apparatus 100 that the application PF 340 provides to applications in the class library group 352. The application PF 340 comprises a BG processing suppression API unit (reference numeral 500) for executing a BG processing a suppression control instruction, and a BG processing suppression release API unit (reference numeral 501) for executing a BG processing suppression release control instruction towards the BG processing management unit 331.

The reference numeral 500 comprises reference numerals 502 and 503. Reference numeral 502 is a definition of a setBackgroundDisabled function which is a BG processing suppression API. Reference numeral 502 receives a key (an application identification object for instructing execution), a disabledTime (BG processing suppression interval), and a disabledCancelFlag (a flag for releasing the BG processing suppression) as arguments. Thereafter, reference numeral 502 adds a flag ("true") representing execution of a setBackgroundDisabled function to the received arguments as a first argument, and executes a setBackgroundInhibitStatus function (reference numeral 510) as actual processing. The flag added here as the first argument will be called "the BG processing suppression flag" hereinafter. Note that the details of the internal processing of reference numeral 510 will be explained later using FIGS. 6A to 6C.

Parameters designated as arguments in reference numeral 502 are explained. The first argument key designates an object for identifying an application that executes the BG processing suppression API of reference numeral 502. The application PF 340 uses this to specify an application that instructed suppression of BG processing. Any value may be used if it can identify the application that instructed the suppression of the BG processing uniquely, and in the present embodiment, the name of the application that executed it is set as the first argument key. The second argument disabledTime designates a predetermined interval that the application suppresses the BG processing. The application PF 340 performs count processing in the suppression interval in the internal processing of reference numeral 510, and makes a BG processing suppression release instruction towards the BG processing management unit 331 when the count becomes zero. Here, for the units of the value designated as the suppression interval, anything may be used. The third argument disabledCancelFlag designates a flag for releasing the BG processing suppression in order to determine whether or not to execute the BG processing suppression release instruction towards the BG processing management unit 331 upon an occurrence of a particular event in the image processing apparatus 100. Note that in the present embodiment, the particular event is assumed to be an event upon which the system of the image processing apparatus 100 transitions into a sleep state, or a screen being displayed on the UI display apparatus 203 transitions to a default screen.

When "true" is designated for the third argument, the BG processing suppression release instruction is made to the BG processing management unit 331 upon the occurrence of the particular event. That is, when the particular event occurs, the suppression of the BG processing is forcibly released. Here, a sleep state transition event is an event upon which transition is made into a power saving mode which occurs in a situation in which the image processing apparatus 100 is not operating for a fixed interval where there is no operation from the user input apparatus 202, for example. Also, a default screen transition event is an event upon which display of the UI display apparatus 203 returns automatically to the default screen (a home screen, or the like) which occurs under the same conditions as the sleep state transition event. In other words in the present embodiment, a particular event is defined as something that occurs when the operation of the image processing apparatus 100 is in a standby state, and by which it can be determined that it is not necessary for the application to execute a BG processing suppression control instruction. Accordingly, the occurrence of such an event is a condition of the suppression release flag. Note that the suppression release flag condition may be a state transition event by which it can be determined that the operation of the image processing apparatus 100 is in a standby state, but it is not limited to this.

Explanation now returns to the definition of the APIs in FIG. 5. Reference numeral 503 is a definition of a setBackgroundDisabled function which is a BG processing suppression API similar to reference numeral 502. Reference numeral 503 receives as arguments a first argument key and a second argument disabledTime. Thereafter, reference numeral 503 adds "true" as a value of a disabledCancelFlag which indicates a suppression release flag to the received arguments, and executes the setBackgroundDisabled function (reference numeral 502). Accordingly, when an application makes an instruction to suppress the BG processing using an API provided by the BG processing suppression API unit (reference numeral 500), the application must designate an object for identifying itself such as an application name and the BG processing suppression interval at the least.

The reference numeral 501 comprises reference numeral 504. Reference numeral 504 is a definition of a setBackgroundEnabled function which is a BG processing suppression release API. Reference numeral 504 receives as arguments key (the object for identifying the execution application) for the first argument. Thereafter, reference numeral 504 adds a flag ("false") representing execution of a setBackgroundEnabled function to the received arguments as a first argument, and executes the setBackgroundInhibitStatus function (reference numeral 511) as actual processing. The first argument of reference numeral 504 designates something identical to the key which is designated upon execution of the setBackgroundDisabled functions (reference numerals 502 and 503), and in the present embodiment the name of the execution application is designated. This is used in order for the application PF 340 to specify that it is a suppression release instruction of the application that instructed suppression of BG processing. Also, in the internal processing of reference numeral 511 when reference numeral 504 is executed, it is not necessary to consider the suppression interval of the BG processing or the flag for releasing the BG processing suppression upon the occurrence of an event. For this reason, in the execution of reference numeral 504 the designation of disabledTime and disabledCancelFlag is not necessary as it is in reference numeral 502. Also, in reference numeral 504, internally appropriate values for execution of reference numeral 511 are set for arguments. In the present embodiment, the values of the arguments are in order "false", key (the application name), "0", and "false".

[Processing Flow]

Figure 6A:
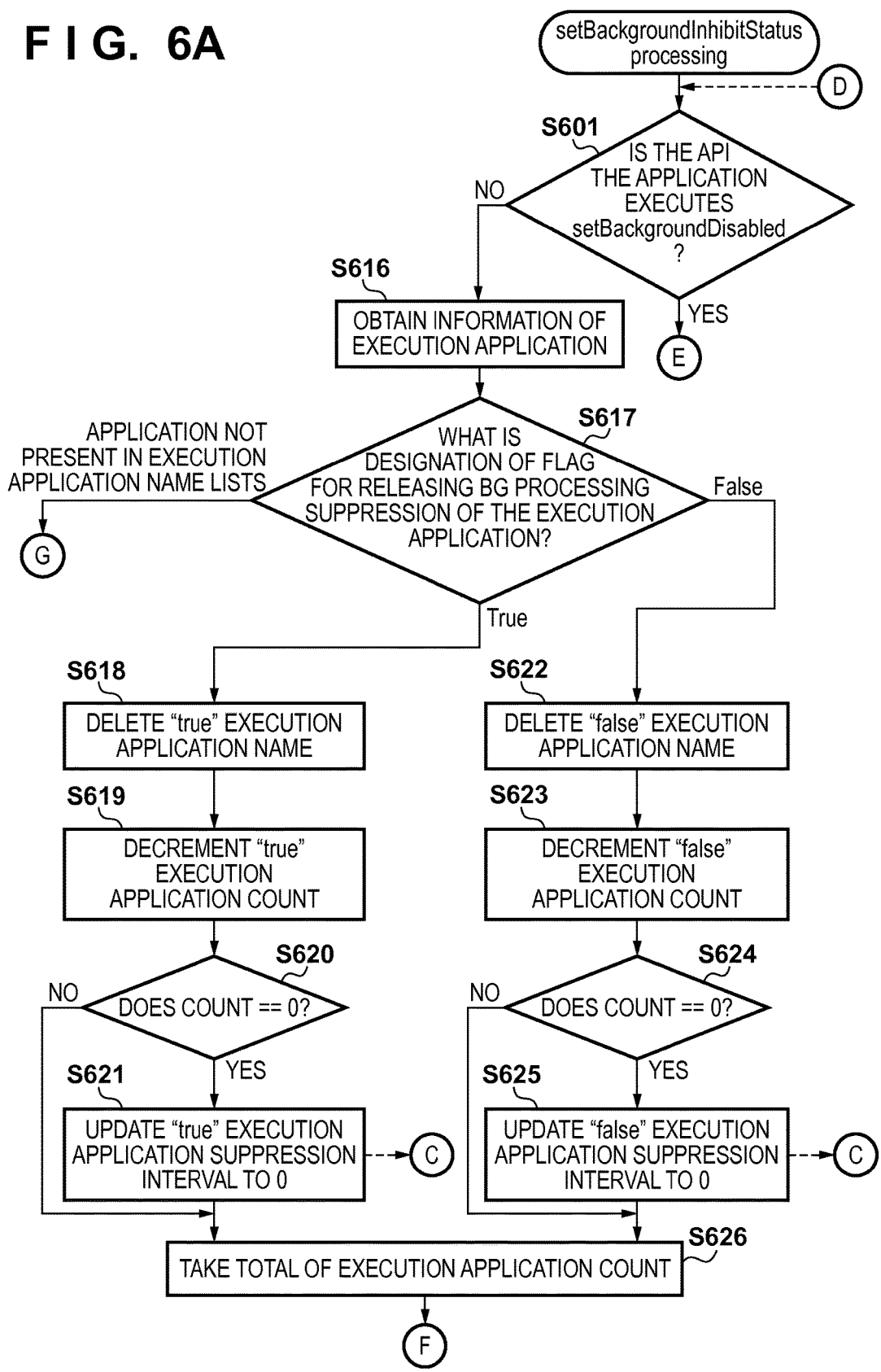
FIGS. 6A, 6B, and 6C are flowcharts according to the first embodiment.
Figure 6B:
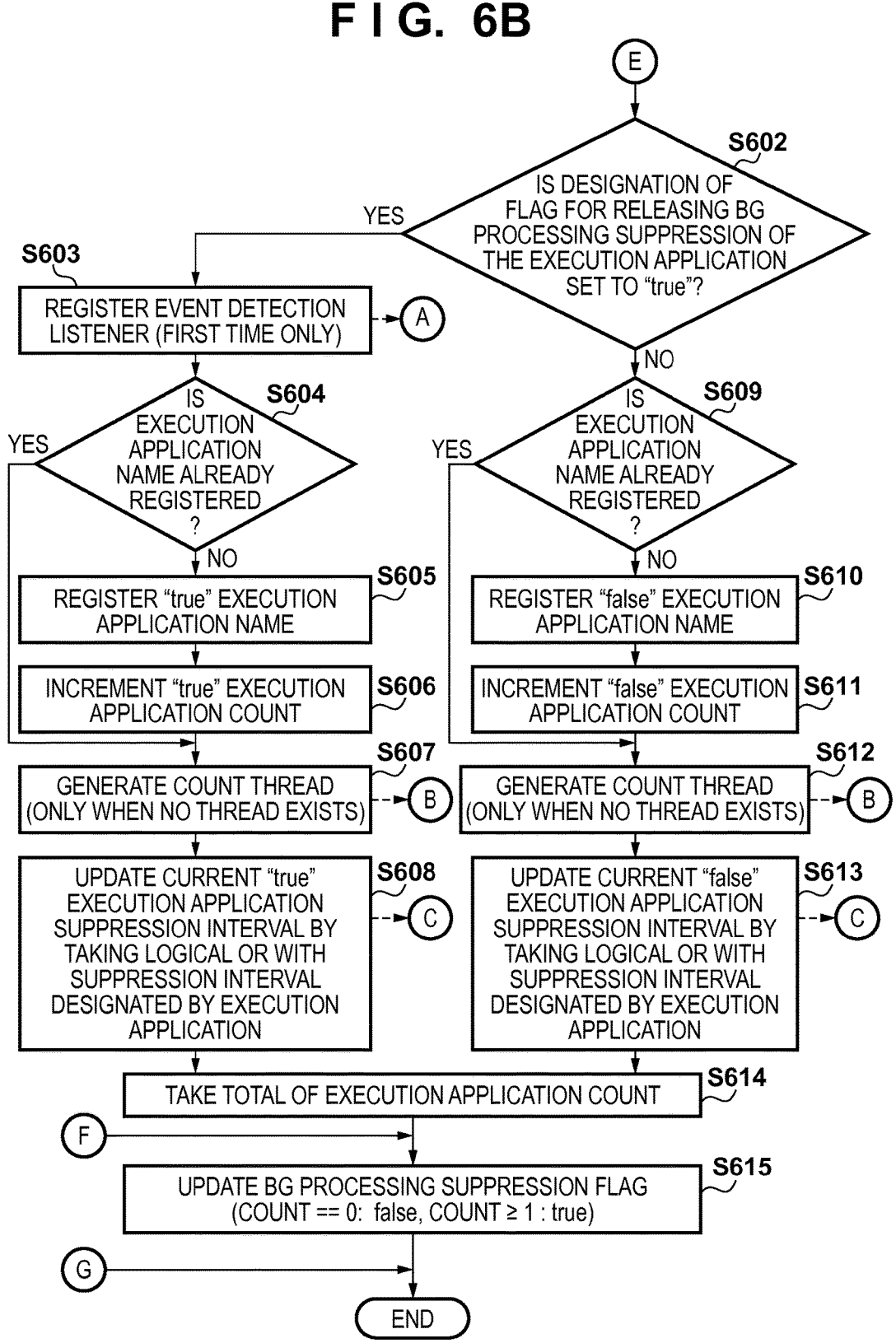
Figure 6C:
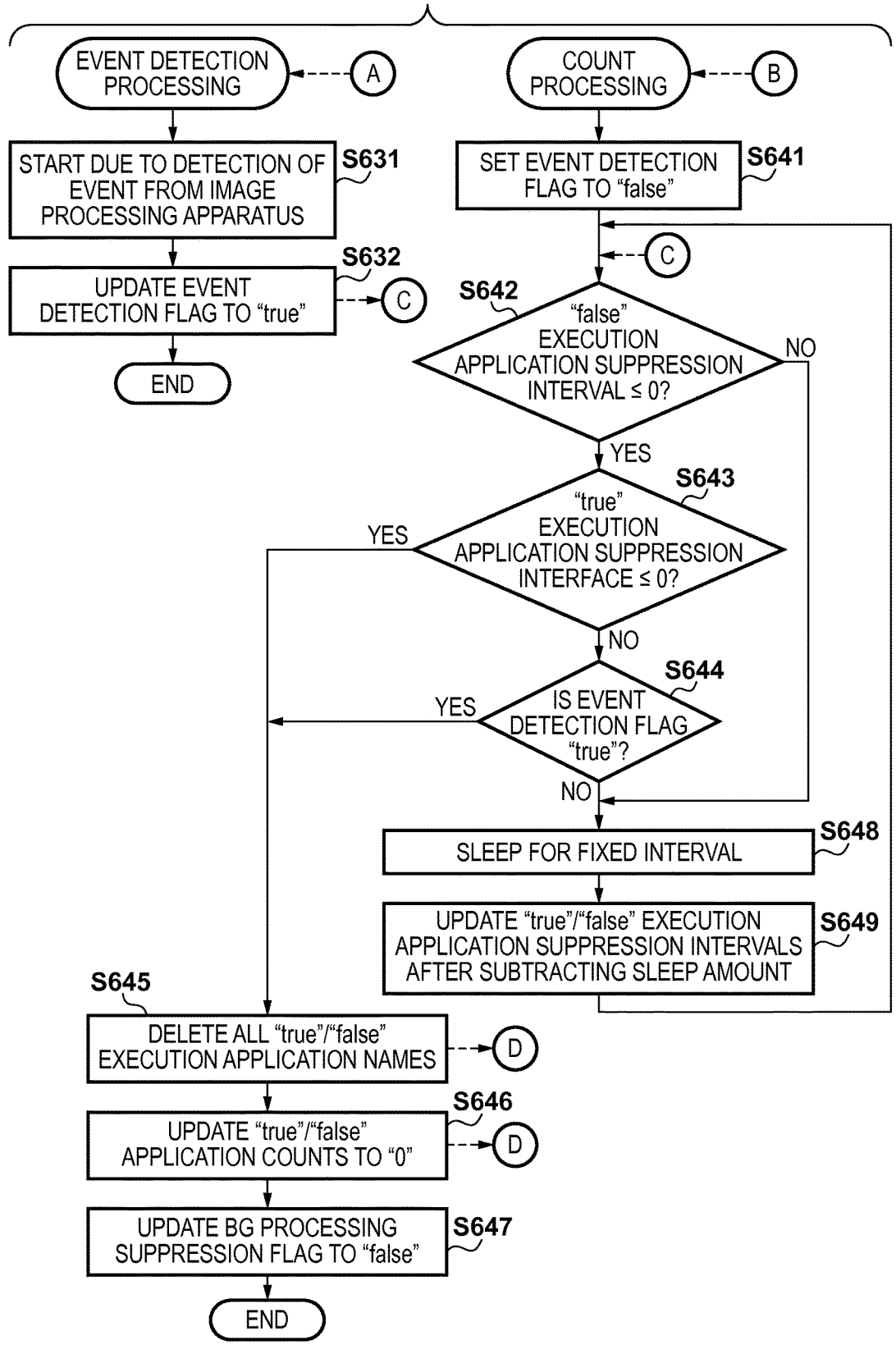

FIGS. 6A and 6B are flowcharts for internal processing of an API for performing control instructions for a BG processing suppression and suppression release in the image processing apparatus 100 that the application PF 340 provides to applications in the class library group 352. Specifically, this processing is processing of the setBackgroundInhibitStatus function (reference numerals 510 and 511) which the BG processing suppression API unit (reference numeral 500) and the BG processing suppression release API unit (reference numeral 501) which are defined in FIG. 5 execute internally. Also, FIG. 6C illustrates flowcharts for event detection processing and BG processing suppression interval count processing which the application PF 340 attaches to processing and executes in parallel processing. Note that in FIGS. 6A to 6C, the broken line arrows indicate timing which is a trigger for the start, determination or the like of other processing accompanying the updating of a value or the like used during processing.

Firstly, using FIGS. 6A and 6B, explanation will be given processing of the setBackgroundInhibitStatus function. When the BG processing suppression API unit (reference numeral 500) or the BG processing suppression release API unit (reference numeral 501) are executed from the application, the application PF 340, in step S601, performs as determination as to which API the application executed. In this determination, the parameter designated as the first argument of the setBackgroundInhibitStatus function is used. If the parameter is "true" it is treated as a setBackgroundDisabled function (reference numerals 502 and 503) being executed, and if the parameter is "false", it is treated as the setBackgroundEnabled function (reference numeral 501) being executed.

If the setBackgroundDisabled function is executed (YES in step S601), the application PF 340, in step S602, determines designation of a suppression release flag of the application which executes the API (hereafter, "the execution application"). In this determination, the parameter designated as the fourth argument of the setBackgroundInhibitStatus function (reference numeral 510) is used. In a case where the designation of the flag is "true" (YES in step S602), and processing is performed for the first time, the application PF 340, in step S603, performs a registration of a listener for receiving that the predetermined event (a sleep or default screen transition event) occurred in the image processing apparatus 100. If it is not the first time, the registration of a listener is not performed. The processing upon event detection is executed in parallel to processing of the setBackgroundInhibitStatus function (reference numeral 510) in the application PF 340.

After this, the application PF 340, in step S604, determines whether or not the application that instructed the execution is an application already registered in a "true" execution application names list. The "true" execution application names list is something that saves names of applications that executed the BG processing suppression API unit (reference numeral 500), and is defined by a variable-length array variable, or the like, in a program. Note that, for this determination, the parameter designated as the second argument of the setBackgroundInhibitStatus function (reference numeral 510) is used.

When the application that instructed the execution is already registered in the "true" execution application names list (YES in step S604), the processing proceeds to step S607. When the application that instructed the execution is not already registered in the "true" execution application names list (NO in step S604), the application PF 340, in step S605, registers the name of the application in the "true" execution application names list. Thereafter, the application PF 340, in step S606, increments a "true" execution application count. The "true" execution application count is something that saves the number of applications that executed the BG processing suppression API unit (reference numeral 500), and is defined by an integer type variable, or the like, in a program. The execution application count is used for determination of an update of a state of a later explained BG processing suppression flag. In step S607, the application PF 340, only in the case where a thread does not exist, generates a thread for counting the elapsing of time of the interval in which the BG processing is suppressed which the application designated. This thread, as is illustrated in FIG. 6C, is executed in parallel to the processing of the setBackgroundInhibitStatus function (reference numeral 510) as processing of a count thread 640 in the application PF 340.

In step S608, the application PF 340 performs processing for updating setting of the interval in which the BG processing is suppressed which the application designated. In the setting update here, the parameter designated in the third argument of setBackgroundInhibitStatus function (reference numeral 510) is used. For the "true" execution application suppression interval in the count in the processing of the count thread 640, the application PF 340 performs updating by taking a logical OR with the suppression interval designated by the parameter designated by the application, the true execution application suppression interval The updated true execution application suppression interval is referenced in the processing of the count thread 640 illustrated in FIG. 6C. After that, the processing proceeds to step S614.

Similarly, in a case where the designation of the flag is "false" (NO in step S602), the application PF 340, in step S609, determines whether or not the application that instructed the execution is an application that is already registered in a "false" execution application names list. The "false" execution application names list is something that saves names of applications that executed the BG processing suppression API unit (reference numeral 500), and is defined by a variable-length array variable, or the like, in a program. Note that, for this determination, the parameter designated as the second argument of the setBackgroundInhibitStatus function (reference numeral 510) is used.

When the application that instructed the execution is already registered in the "false" execution application names list (YES in step S609), the processing proceeds to step S612. When the application that instructed the execution is not already registered in the "false" execution application names list (NO in step S609), the application PF 340, in step S610, registers the name of the application in the "false" execution application names list. Thereafter, the application PF 340, in step S611, increments a "false" execution application count. The "false" execution application count is something that saves the number of applications that executed the BG processing suppression API unit (reference numeral 500), and is defined by an integer type variable, or the like, in a program. The execution application count is used for determination of an update of a state of a later explained BG processing suppression flag. In step S612, the application PF 340, only in the case where a thread does not exist, generates a thread for counting the elapsing of time of the interval in which the BG processing is suppressed which the application designated. This thread, as is illustrated in FIG. 6C, is executed in parallel to the processing of the setBackgroundInhibitStatus function (reference numeral 510) as processing of the count thread 640 in the application PF 340.

In step S613, the application PF 340 performs processing for updating setting of the interval in which the BG processing is suppressed which the application designated. In the setting update here, the parameter designated in the third argument of setBackgroundInhibitStatus function (reference numeral 510) is used. The application PF 340 updates the "false" execution application suppression interval in the count in the processing of the count thread 640 of FIG. 6C, performs by performing a logical OR on it with the suppression interval designated by the parameter designated by the application. The updated false execution application suppression interval is referenced in the processing of the count thread 640 of FIG. 6C. After that, the processing proceeds to step S614.

In step S614, the application PF 340 takes a total of the execution application counts for both "true" and "false".

In step S615, the application PF 340 updates the state of the BG processing suppression flag from the total of the execution application counts. In a case where the total execution application count is "0", the application PF 340 sets the BG processing suppression flag to "false". In a case where the total execution application count is "1" or more, the application PF 340 sets the BG processing suppression flag to "true". The BG processing suppression flag is used to determine whether or not to initiate execution of BG processing by the BG processing management unit 331. If the BG processing suppression flag is "false", the BG processing management unit 331 can make an instruction for the execution of the BG processing to a corresponding process.

On the other hand, in the case where the setBackgroundEnabled function (reference numeral 501) is executed (NO in step S601), the application PF 340, in step S616, obtains information as to whether or not the application that executes the API exists in the "true" or "false" execution application name lists. This obtaining is realized by searching each of the "true" and "false" execution application name lists using the parameter designated in the second argument of the setBackgroundInhibitStatus function (reference numeral 511) by the application PF 340. After obtaining the information, the application PF 340, in step S617, determines the designation of the suppression release flag of the execution application.

If, in the determination of step S617, the flag is "true", the application PF 340, in step S618, deletes the name of the application from the "true" execution application name list. Thereafter, the application PF 340, in step S619, decrements the "true" execution application count. Then the application PF 340, in step S620, determines whether or not the "true" execution application count is "0", i.e. whether or not there exists an application that performed an instruction to suppress the BG processing. In a case where the "true" execution application count is not "0" (NO in step S620), the processing proceeds to step S626. In a case where the "true" execution application count is "0" (YES in step S620), the application PF 340, in step S621, updates the "true" execution application suppression interval to "0". After that, the processing proceeds to step S626.

Similarly, if, in the determination of step S617, the flag is "false", the application PF 340, in step S622, deletes the name of the application from the "false" execution application name list. Thereafter, the application PF 340, in step S623, decrements the "false" execution application count. Then the application PF 340, in step S624, determines whether or not the "false" execution application count is "0", i.e. whether or not there exists an application that performed an instruction to suppress the BG processing. In a case where the "false" execution application count is not "0" (NO in step S624), the processing proceeds to step S626. In a case where the "false" execution application count is "0", the application PF 340, in step S625, updates the "false" execution application suppression interval to "0".

In step S626, the application PF 340 takes a total of the execution application counts for both "true" and "false". After that, the processing proceeds to step S615, and the application PF 340 updates the state of the BG processing suppression flag from the total of the execution application counts. This processing flow is then terminated.

Note that, in the determination of step S617, when the parameter designated in the second argument does not exist in either of the true or false execution application name lists, this processing flow ends without the application PF 340 executing the processing thereafter. This corresponds to a case where prior to the application executing the setBackgroundDisabled function (reference numerals 502 and 503), the setBackgroundEnabled function (reference numeral 501) is executed. In this case, the application PF 340 ends the processing of the setBackgroundInhibitStatus function (reference numerals 510 and 511).

Next, using FIG. 6C, explanation will be given for event detection processing. In step S603 of FIG. 6B, after registering the sleep or default screen transition event detection listener, the application PF 340, in step S631, in a case where the occurrence of the event is detected, starts the processing of an event notification function corresponding to the listener. In other words, the application PF 340, so long as a predetermined event does not occur, does not execute the event detection processing illustrated in FIG. 6C.

The application PF 340, in step S632, updates the event detection flag to "true". The updated event detection flag is referenced in the processing of the count thread 640 illustrated in FIG. 6C.

Finally, using FIG. 6C, explanation will be given for BG processing suppression interval count processing. After generating the count thread 640 in either of step S607 or step S612 of FIG. 6B, the application PF 340, in step S641, sets the event detection flag to "false". These steps are executed as initialization processing upon generation of the count thread 640 by the application PF 340. Thereafter, the application PF 340 executes count processing based on the execution application suppression interval and the state of the event detection flag. Note that the execution application suppression interval is updated by the processing of the setBackgroundInhibitStatus function (reference numerals 510 and 511). Also, the event detection flag is updated by the event detection processing of FIG. 6C.

In step S642, the application PF 340 determines whether or not the "false" execution application suppression interval has elapsed. If it is during the BG processing suppression interval for a "false" execution application (NO in step S642), the application PF 340 executes "true" and "false" execution application suppression interval count processing from step S648 at that point in time.

If the "false" execution application suppression interval has elapsed (YES in step S642), the application PF 340, in step S643, determines whether or not the "true" execution application suppression interval has elapsed. If the BG processing suppression interval for a "true" execution application has elapsed already (YES in step S643), the application PF 340 executes processing for releasing the BG processing suppression flag from step S645 at that point in time.

If the "true" execution application suppression interval has not elapsed (NO in step S643), the application PF 340, in step S644, confirms whether or not the event detection flag is "true". If the event detection flag is "true" (YES in step S644), i.e. if the sleep or default screen transition event has occurred during the BG processing suppression interval count processing, the application PF 340 executes processing from step S645 to release the BG processing suppression flag. If the event detection flag is "false" (NO in step S644), the application PF 340 executes the "true" and "false" execution application suppression interval count processing from step S648.

In step S645, the application PF 340 deletes all of the execution application names registered in the "true" and "false" execution application name lists. The application PF 340, in step S646, updates the "true" and "false" execution application suppression intervals to "0". The application PF 340, in step S647, updates the BG processing suppression flag to "false". This processing flow is then terminated.

The application PF 340, in step S648, causes the processing of the count thread 640 to sleep for a fixed interval. After that, the application PF 340, in step S649, updates the "true" and "false" execution application suppression intervals by subtracting the fixed interval amount of time that the processing of the count thread 640 is caused to sleep. Then the application PF 340 repeats the determination processing from step S642.

[Processing Sequence]

Figure 7A:
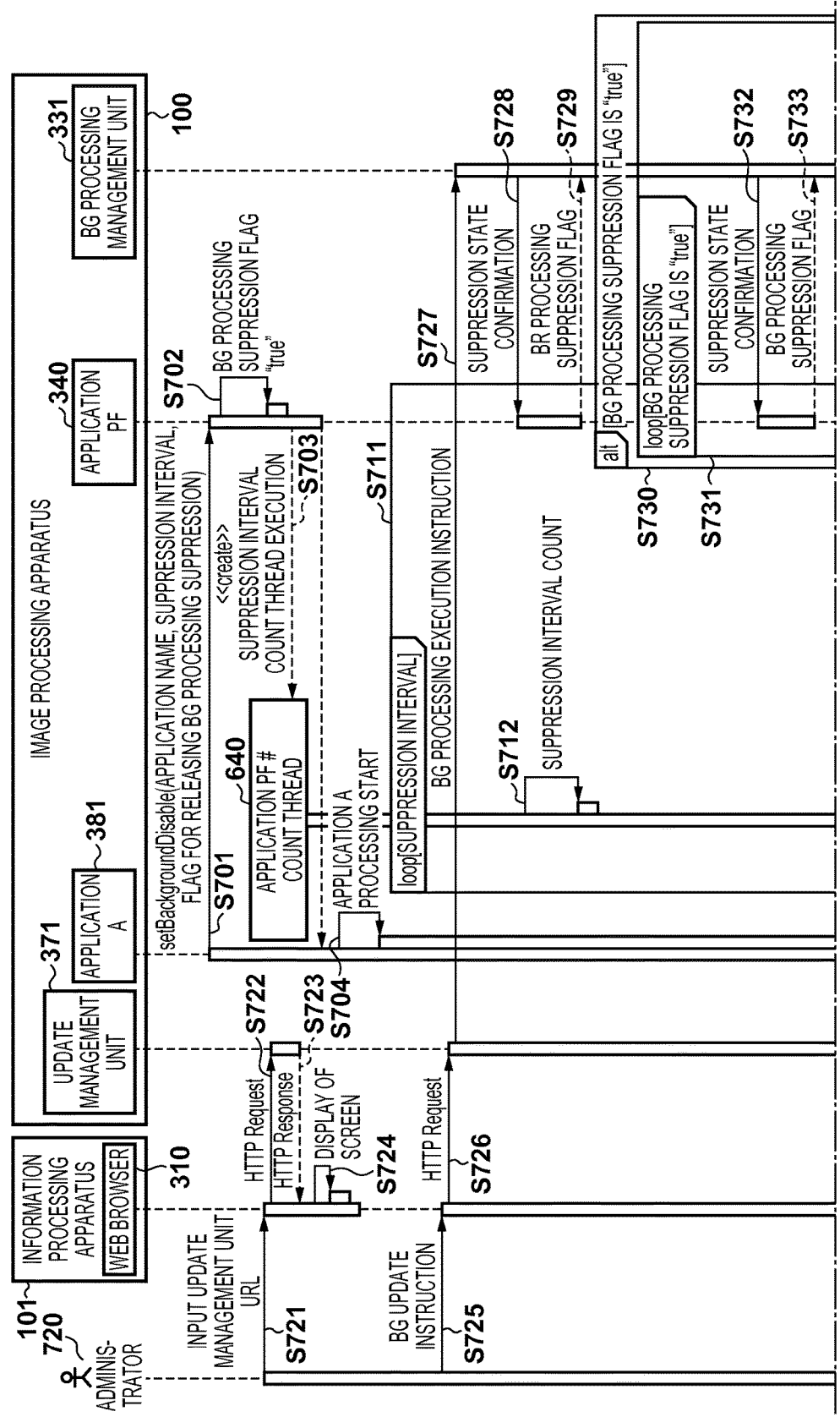
FIGS. 7A and 7B are sequences diagram according to the first embodiment.
Figure 7B:
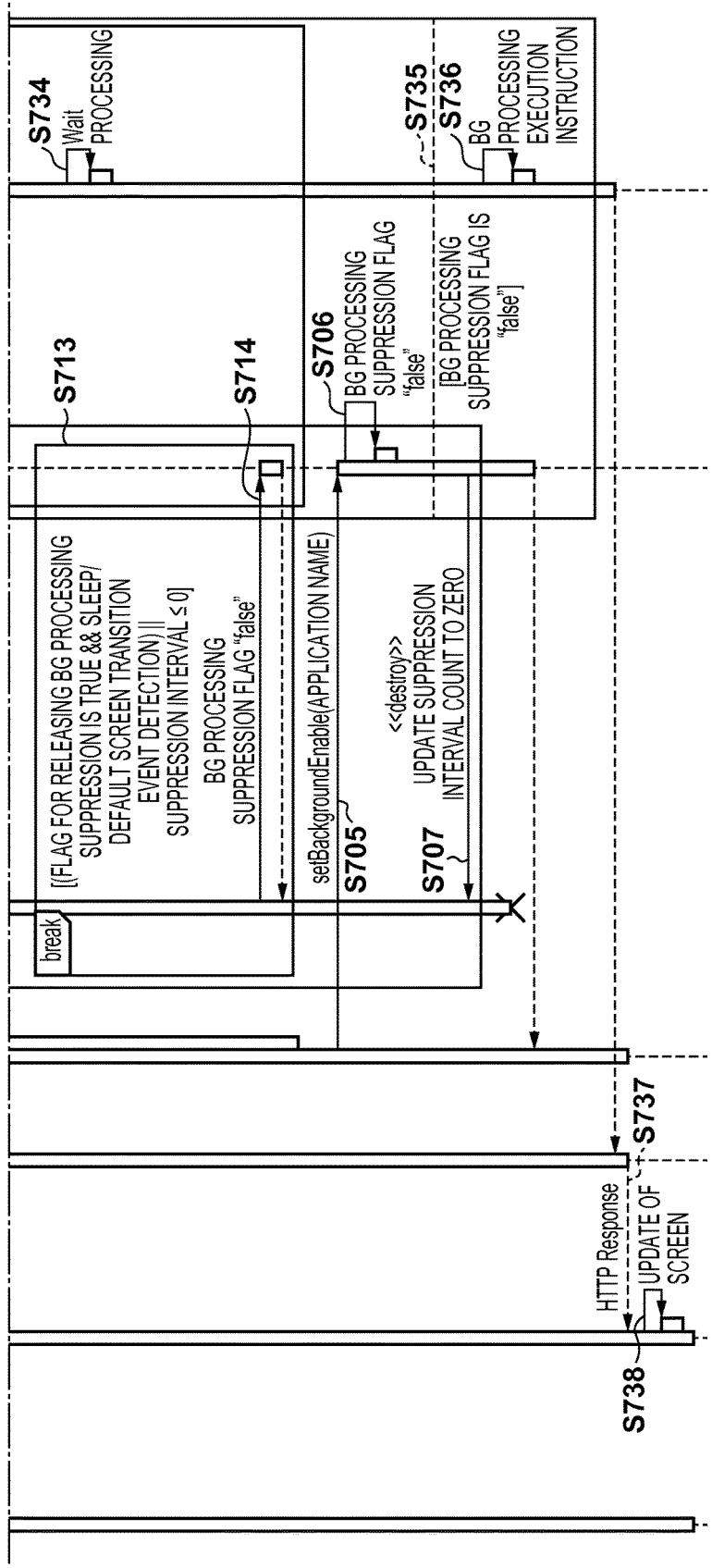

Next, processing for suppressing the BG processing of the image processing apparatus 100 from an application in the present embodiment will be explained using FIGS. 7A and 7B. FIGS. 7A and 7B are sequences diagram for showing a processing procedure for a BG processing suppression instruction and a suppression release instruction by the application PF 340 when the application A 381 executes the BG processing suppression instruction API and the BG processing suppression release API. Also, FIGS. 7A and 7B illustrate sequences of a BG processing execution procedure via the update management unit 371 by an administrator 720.

Step S701 to step S707 represent processing steps of the application A 381, and in the present embodiment, processing from the BG processing suppression processing unit recited in FIG. 4 (reference numeral 400) is executed. Step S711 to step S714 represent processing steps of BG processing suppression interval count processing and event detection processing of the application PF 340 started in parallel upon an instruction of the BG processing suppression instruction API. Step S721 to step S738 represent steps for processing a BG processing execution instruction from the administrator 720 which are executed independently to an instruction of the BG processing suppression instruction API.

The application A 381, in step S701, makes an instruction to the application PF 340 for suppression of the BG processing using the BG processing suppression API (reference numeral 502). In the present embodiment, the application A 381 executes the BG processing suppression API in a state having the arguments recited in reference numeral 401 of FIG. 4.

In step S702, the application PF 340, as processing for updating the BG processing suppression flag based on the BG processing suppression instruction from the application A 381, sets this flag to "true". The details of the processing performed in step S702 correspond to step S601 to step S608, step S614, and step S615 of FIGS. 6A and 6B. The processing of step S702 is attached, and the application PF 340, in step S703, generates the count thread 640 for counting the BG processing suppression interval designated by the application A 381. The details of the processing performed in step S702 correspond to step S607 to step S612 of FIG. 6B.

The application A 381, in step S704, performs control instruction in relation to the image processing apparatus 100. The processing performed in step S704 corresponds to reference numeral 402 of FIG. 4, and is for a unique function comprised in the application A 381. The application A 381, in step S705, makes an instruction to the application PF 340 for release of suppression of the BG processing using the BG processing suppression release API (reference numeral 504). In the present embodiment, the application A 381 executes the BG processing suppression release API in a state having the arguments recited in reference numeral 403 of FIG. 4. In step S706, the application PF 340, as processing for updating the BG processing suppression flag based on the BG processing suppression release instruction from the application A 381, sets this flag to "false". The details of the processing performed in step S706 correspond to step S601, step S616-step S619, step S626, and step S615 of FIGS. 6A and 6B. The processing of step S706 is attached, and the application PF 340, in step S707, updates the count of the BG processing suppression interval designated by the application A 381 to zero. The details of the processing performed in step S707 correspond to step S620 to step S621 of FIG. 6A.

The application PF 340, in step S711, via the count thread 640, repeats the count of the BG processing suppression interval designated by the application A 381 until the count is less than or equal to zero. The details of the processing performed in step S711 correspond to a processing sequence of step S641 to step S644, step S648, and step S649 of FIG. 6C. Also, as step S712, the details of the suppression interval count processing executed by the count thread 640 which is performed within step S711 corresponds to step S648 and step S649 of FIG. 6C.

Here, in step S713, processing is recited for a case where the sleep or default screen transition event is detected or a case where the BG processing suppression interval count designated by the application A 381 elapsed. Specifically, this corresponds to a state in which the event detection processing (in FIG. 6C) is executed and the determination of step S644 of FIG. 6C is performed, or a case when the determination of step S643 of FIG. 6C is YES.

In a case where the condition of step S713 is satisfied, the count thread 640, in step S714, updates the BG processing suppression flag to "false". The details of the processing performed in step S714 correspond to step S645 to step S647 of FIG. 6C.

The administrator 720, in step S721, inputs a URL (Uniform Resource Locator) to access the update management unit 371 into the Web browser 310, and requests a connection. The Web browser 310, in step S722, transmits an HTTP Request to the update management unit 371 via the communication unit 300. The update management unit 371, in step S723, transmits HTML data (not shown) configuring an update management operation screen to the Web browser 310 via the communication unit 372 as an HTTP Response in response to the HTTP Request. The Web browser 310, in step S724, analyzes the received HTML data, and performs a display of the update management operation screen on the Web browser 310.

The administrator 720, in step S725, inputs an instruction into the Web browser 310 for updating firmware written to the storage apparatus 208 by BG processing, and a request is thereby made to the update management unit 371 for the execution of that instruction. The Web browser 310, in step S726, transmits an HTTP Request to the update management unit 371 via the communication unit 300. The update management unit 371, in step S727, receives the request from the Web browser 310 and makes an instruction towards the BG processing management unit 331 for the execution of firmware updating BG processing.

In step S728 and step S729, the BG processing management unit 331 confirms whether or not it is a state in which the BG processing can be executed, for each of the processing units that comprise the BG processing suppression flag, and receives the states of each of the flags. In the present embodiment, the application PF 340 comprises the BG processing suppression flags, and the BG processing management unit 331 makes a confirmation towards the application PF 340 as to the state of the BG processing suppression flags.

In a case where even one of the BG processing suppression flags is "true", the BG processing management unit 331 enters a state of waiting for release of the BG processing suppression flag in step S730. In other words, in a case where BG processing suppression is instructed overlappingly by a plurality of the applications, the suppression is continued until all of the flags are released. In the processing of step S730, the BG processing management unit 331, in step S731, executes loop processing until the BG processing suppression flags are all "false". Specifically, the confirmation of the states of the BG processing suppression flags is performed in step S732 and step S733, and fixed interval Wait processing is performed in step S734. The processing of step S732 and step S733 is the same as the processing of step S728 and step S729.

In a case where all of the BG processing suppression flags are "false", the BG processing management unit 331 enters a state of BG processing execution initiation in step S735. In the state of step S735, in a case where the BG processing management unit 331 receives the BG processing execution instruction as in step S727, an instruction for the execution of the BG processing is made to a corresponding process in step S736. In the present embodiment, an instruction is made to the process that performs the update of the firmware for the execution of the BG processing for updating the firmware from the update management unit 371.

The update management unit 371, in step S737, after completion of the processing sequence transmits HTML data (not shown) configuring a processing completion notification screen as an HTTP Response in response to the request to the Web browser 310 via the communication unit 372. The Web browser 310, in step S738, analyzes the received HTML data, and performs a display of the completion notification screen on the Web browser 310.

In the first embodiment, it is possible to suppress the execution of BG processing in the image processing apparatus 100 while an application instructs BG processing suppression. By doing this, the image processing apparatus 100 can realize causing application to operate stably.

Also, by adding information for releasing the suppression of the BG processing when the application instructs a suppression of the BG processing, it is possible for the image processing apparatus 100 to actively release the suppression of the BG processing, and execute the BG processing. With this, it becomes possible to avoid a state in which the image processing apparatus 100 suppresses the execution of BG processing more than is necessary.

Additionally, in the present embodiment, when the update management unit 371 makes an instruction to the BG processing management unit 331 for BG processing execution, an execution instruction is performed via the Web browser 310 from the administrator 720. However, as long as it is possible for the BG processing management unit 331 to receive an instruction for execution of BG processing, determine the state of the BG processing suppression flag, and execute the BG processing, there is no limitation to this configuration. Accordingly, for example, the form may be such that the update management unit 371 has an operation screen for the UI display apparatus 203, and the update instruction is performed in the BG via the operation screen from the administrator 720, or the form may be such that upon the passage of a particular date/time, the update instruction is performed automatically in the BG. Also, the BG processing execution instruction may be from different processing such as execution of a log collection in the BG in a job log management unit (not shown) that periodically collects logs of jobs executed by the image processing apparatus 100.

Second Embodiment

Next, explanation is given for a second embodiment of the present invention. In the configuration of the first embodiment, in a case where a large number of applications that execute the BG processing suppression API exist, it results in falling into a state in which the BG processing of the image processing apparatus 100 cannot be executed over a long period of time. For example, in a case of an application that provides an operation screen to the UI display apparatus 203 of the image processing apparatus 100, an influence of operationally degradation is felt due to execution of BG processing. For this reason, the application PF 340 permits instruction of suppression of the BG processing for the application, and it is appropriate that the suppression of BG processing execution of the image processing apparatus 100 continues for a long period as a result. Meanwhile, in the case of applications whose performance is largely unaffected even when BG processing occurs, such as an application that periodically collects logs of jobs executed by the image processing apparatus 100, for example, the need to execute its own processing suppressing the BG processing by the BG processing suppression API is low.

In the second embodiment, the application PF 340 adds processing for arranging a restriction for the execution of the BG processing suppression API in accordance with the type and state of the application which executes the BG processing suppression API in accordance with the above described application characteristics. Below, differences from the first embodiment are explained using FIG. 8A to FIG. 11B.

In the second embodiment, applications that are restricted upon the execution of the BG processing suppression API, and applications for which is not the case are defined in advance. In the present embodiment, applications that provide operation screens to the UI display apparatus 203 (hereinafter "LUI applications"), system applications, login applications, and applications in the process of activation processing are classified as applications that are not restricted in relation to BG processing suppression. Such applications are applications for which performance related mainly to user operability is required, and therefore these are classified as applications that are not restricted. Also, even in a case where a particular event occurs during BG processing suppression, the suppression is handled as something that cannot be released. Applications other than those described above are classified as applications that are restricted upon the execution of the BG processing suppression API. Applications thus classified are handled as applications for which the execution of BG processing suppression itself is restricted. Here, a system application is an application that provides a function that configures the application PF 340 existing on the system application unit 370. Also, a login application is an application for performing processing related to a user authentication in the image processing apparatus 100. Furthermore, an application during activation processing is an application whose state is in the middle of being changed from a suspended state during the start of activation by the framework 350.

Using FIG. 8A to FIG. 10, explanation will be given for a method of determining an application that is not restricted as illustrated above. Also, using FIGS. 11A and 11B, explanation will be given for internal processing of the BG processing suppression API when a restriction is arranged upon the execution of the BG processing suppression API.

Figure 8A:
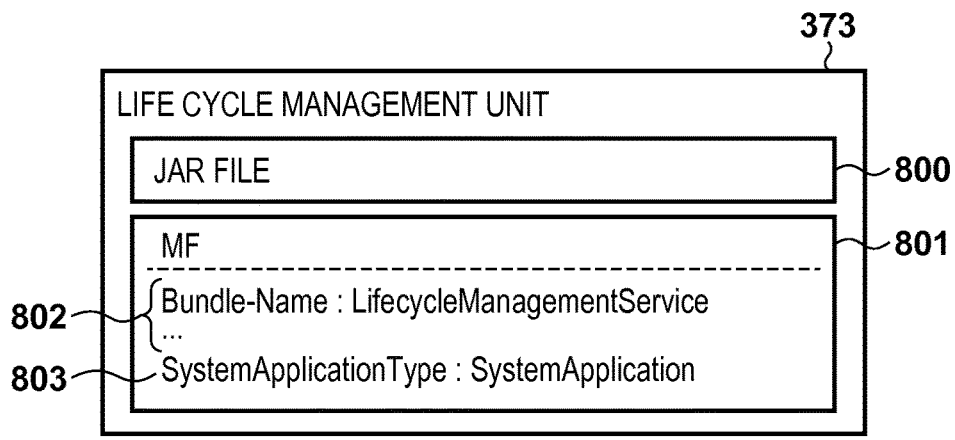
FIGS. 8A, 8B and 8C are views for illustrating an example configuration of applications according to a second embodiment.
Figure 8B:
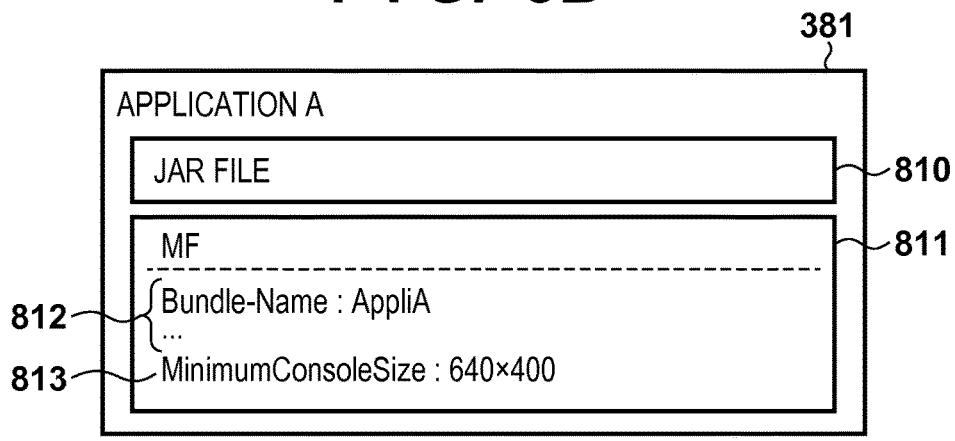
Figure 8C:
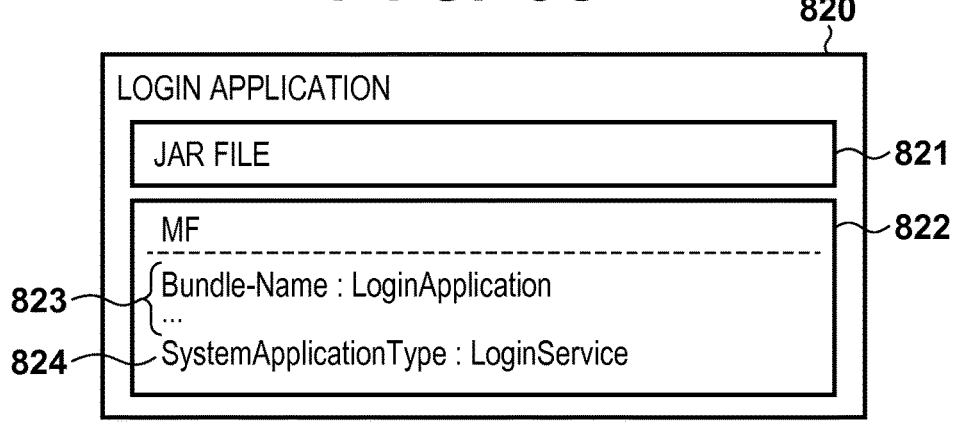

FIG. 8A to FIG. 8C are example configurations of applications that are not restricted upon the execution of the BG processing suppression API and manifest files (hereinafter "MF") that the application PF 340 comprises. An MF is something that describes metadata for managing a life cycle and a dependency relation of an application by the OSGi 351 that configures the framework 350. The applications that the application PF 340 comprises are assumed to have MFs in addition to JAR files that configure their functions.

FIG. 8A is an example of a configuration and an MF of an application of the life cycle management unit 373. The life cycle management unit 373 comprises an MF 801 and a JAR file 800 that configures its functions. The MF 801 comprises a system application setting declaration 803 in addition to generic metadata 802 for functioning on the framework 350. Applications comprising the system application setting declaration 803 are determined to be system applications by the framework 350, and are managed by the system application unit 370. Also, applications not comprising the system application setting declaration 803 are determined to be general applications by the framework 350, and are managed by the application unit 380. In the present embodiment, applications having the system application setting declaration 803 are not restricted upon the execution of the BG processing suppression API.

FIG. 8B is an example of a configuration and an MF of an application; the application A 381. The application A 381 comprises an MF 811 and a JAR file 810 that configures its functions. The MF 811 comprises a minimum screen size declaration 813 in addition to generic metadata 812 for functioning on the framework 350. The minimum screen size declaration 813 is a declaration for defining a minimum screen size that is needed when an LUI application displays a screen on the UI display apparatus 203 of the image processing apparatus 100. This is used for a determination as to whether or not an LUI application can display on the image processing apparatus 100 because there are cases in which the UI display apparatus 203 that the image processing apparatus 100 comprises differs depending on the model of the image processing apparatus 100. In the present embodiment, an application having the minimum screen size declaration 813 is determined to be an LUI application, and is not restricted upon the execution of the BG processing suppression API.

FIG. 8C is an example of a configuration and an MF of an application; a login application 820. Here, in the present embodiment, in addition to the configuration of the first embodiment, the application PF 340 comprises the login application 820 in the system application unit 370. The login application 820 comprises an MF 822 and a JAR file 821 that configures its functions. The MF 822 comprises a login application setting declaration 824 in addition to generic metadata 823 for functioning on the framework 350. Applications comprising the login application setting declaration 824 are determined to be login applications that perform authentication by the framework 350, and are managed by the system application unit 370. In the present embodiment, applications having the login application setting declaration 824 are not restricted upon the execution of the BG processing suppression API.

FIG. 9A illustrates an example configuration of an application management table of applications that exist on the application PF 340 that are managed on the framework 350. The application management table is held in the storage apparatus 208, or the like. The framework 350 registers information of MFs that applications existing on the application PF 340 comprise in the application management table. The framework 350 uses the application management table in order to perform activation status information management. The application management table comprises a bundle 900, a state 901, metadata information 902 a SystemApplicationType 903, and a MinimumConsoleSize 904.

The bundle 900 is a name of an application that exists on the application storage region 360. In the present embodiment, the framework 350 registers the application name (Bundle-Name) recited in the MF that the application comprises. For this reason, as the name of the application that the framework 350 registers for the bundle 900, the life cycle management unit 373 is registered with the application name of "LifeCycleManagementService". Similarly, the update management unit 371 and the application A 381 are registered as "UpdateManagementService" and "AppliA" respectively. Also, the login application 820 added in the present embodiment is registered as "LoginApplication", and an application B 910 newly added to the configuration illustrated in the first embodiment is registered as "AppliB" respectively. Here, the application B 910 comprises processing that is the same as that of the processing implementation unit (FIG. 4) that makes the control instruction including the BG processing suppression in the application A 381. Also, the application B 910 is an application managed by the application unit 380, and is an application that is not an LUI application. Also, the application B 910 is an application whose activation state is "suspended state" according to the framework 350. For this reason, in the state illustrated in FIG. 9A, the application B 910 is determined to be an application that is restricted upon the execution of the BG processing suppression API by the application PF 340.

The state 901 illustrates an activation state of the application recited in the bundle 900 which is managed by the framework 350. In the present embodiment, the life cycle management unit 373, the update management unit 371, the application A 381, and the login application 820 are in the "activated state (ACTIVE)". Also, the application B 910 is installed but not activated "suspended state (INSTALLED)". The metadata information 902 illustrates general metadata recited in the MF that the application possesses. In the present embodiment, it is assumed to be something that recites version information of the application (version) for example.

The SystemApplicationType 903 comprises a system/login application setting declaration recited in the MF that the application possesses. In the present embodiment, the life cycle management unit 373 of FIG. 8A and the update management unit 371 comprise the system application setting declaration 803 ("System Application"). Also, as is illustrated in FIG. 8C, the login application 820 comprises the login application setting declaration 824 ("LoginService"). The MinimumConsoleSize 904 comprises a minimum screen size declaration recited in the MF that the application possesses. In the present embodiment, as is illustrated in FIG. 8B, the application A 381 comprises the minimum screen size declaration 813 (640×400).

FIG. 9B and FIG. 9C are application management tables for when the framework 350 causes the activation state of the application B 910 to change from the state illustrated in FIG. 9A. Details are explained using FIG. 10.

FIG. 10 is a flowchart for illustrating a procedure of the activation processing of the application B 910 in the life cycle management of the application of the life cycle management unit 373.

An administrator 1000 of the image processing apparatus 100, in step S1001, inputs a URL for accessing the life cycle management unit 373 and makes a request for a connection to the Web browser 310. The Web browser 310 transmits an HTTP Request to the life cycle management unit 373 via the communication unit 300.

The life cycle management unit 373, in step S1002, transmits HTML data (not shown) configuring an operation screen for the life cycle management to the Web browser 310 via the communication unit 374. The Web browser 310 analyzes the received HTML data, and performs a display of the life cycle management operation screen on the Web browser 310.

The administrator 1000, in step S1003, inputs an instruction to activate the application B 910 into the Web browser 310, and a request is thereby made to the life cycle management unit 373 for the execution of the instruction. The Web browser 310 transmits an HTTP Request to the life cycle management unit 373 via the communication unit 300.

The life cycle management unit 373, in step S1004, receives the execution instruction from the Web browser 310, and transmits an instruction for starting the activation of the application B 910 to the framework 350. At this point, the framework 350, in addition to starting the activation processing of the application B 910, updates the state 901 of the application B 910 managed in the application management table to "STARTING". The application management table in this state is illustrated in FIG. 9B. The framework 350 causes the state 901 of the application B 910 to change from "INSTALLED" to "STARTING", and with this, it is indicated that the application B 910 is an application that is during processing for activation. In this state, the application B 910 is determined to be an application that is not restricted upon the execution of the BG processing suppression by the application PF 340.

In step S1005, the framework 350 causes the activation processing of the application B 910 to complete, and updates the state 901 of the application B 910 managed in the application management table to "ACTIVE". The application management table in this state is illustrated in FIG. 9C. The framework 350 causes the state 901 of the application B 910 to change from "STARTING" to "ACTIVE", and with this, it is indicated that the application B 910 is an application that is in an activated state. In this state, the application B 910 is determined to be an application that is restricted upon the execution of the BG processing suppression by the application PF 340.

The life cycle management unit 373, in step S1006, after completion of the processing sequence, transmits HTML data (not shown) configuring a processing completion notification screen in response to the request to the Web browser 310 via the communication unit 374. The Web browser 310 analyzes the received HTML data, and performs a display of the processing completion notification screen on the Web browser 310. This processing flow is then terminated.

Note that in the present embodiment, because the framework 350 executes the life cycle management of the application, an execution instruction is made by the life cycle management unit 373 via the Web browser 310 from the administrator 1000. However, the configuration may be such that the administrator 1000 can make an instruction to the framework 350 for a request for life cycle management such as inputting a request instruction command to the framework 350 via the user input apparatus 202, for example. For this reason, the configuration is not something that is limited.

Figure 11A:
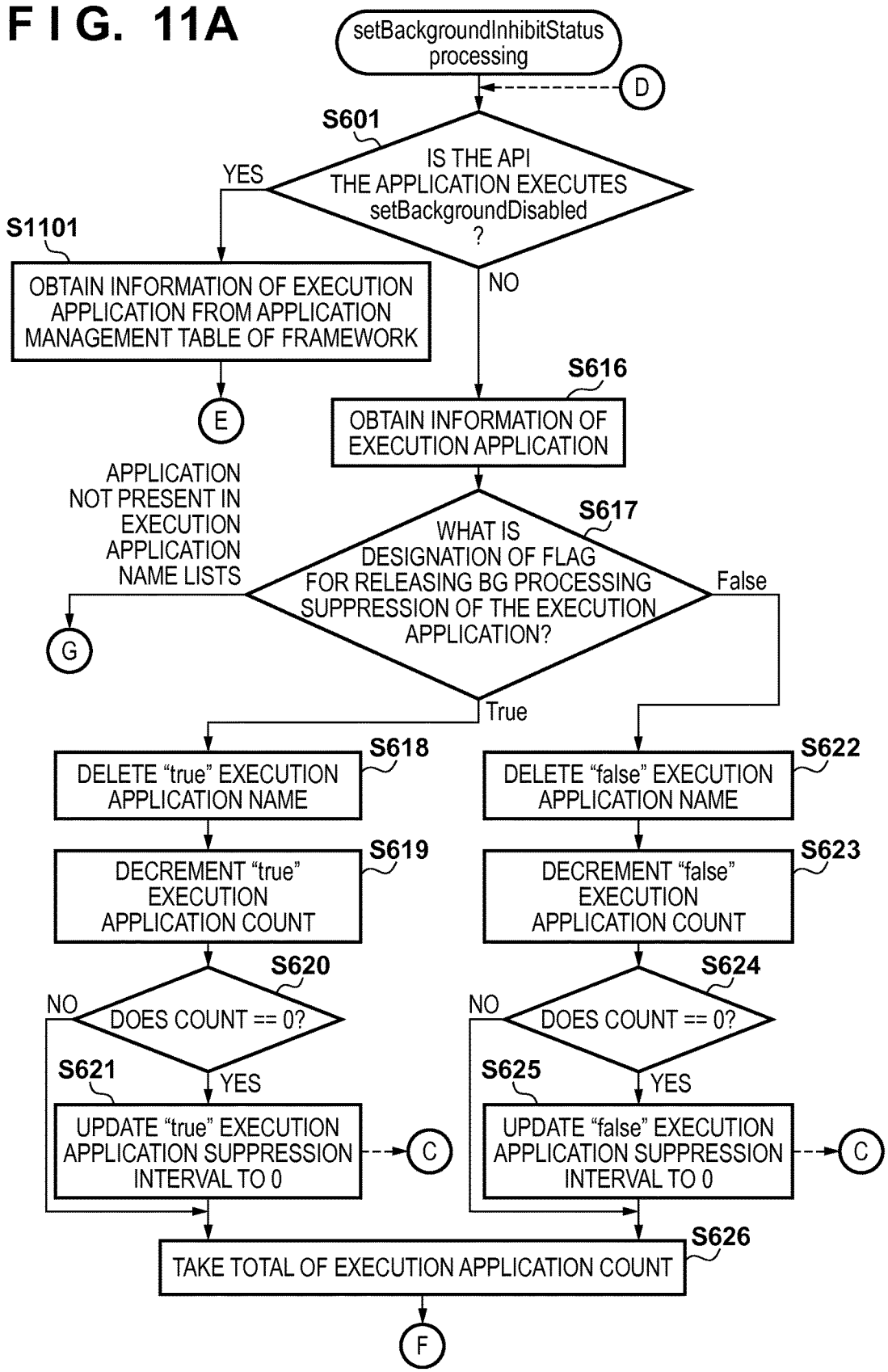
FIGS. 11A and 11B are flowcharts according to the second embodiment.
Figure 11B:
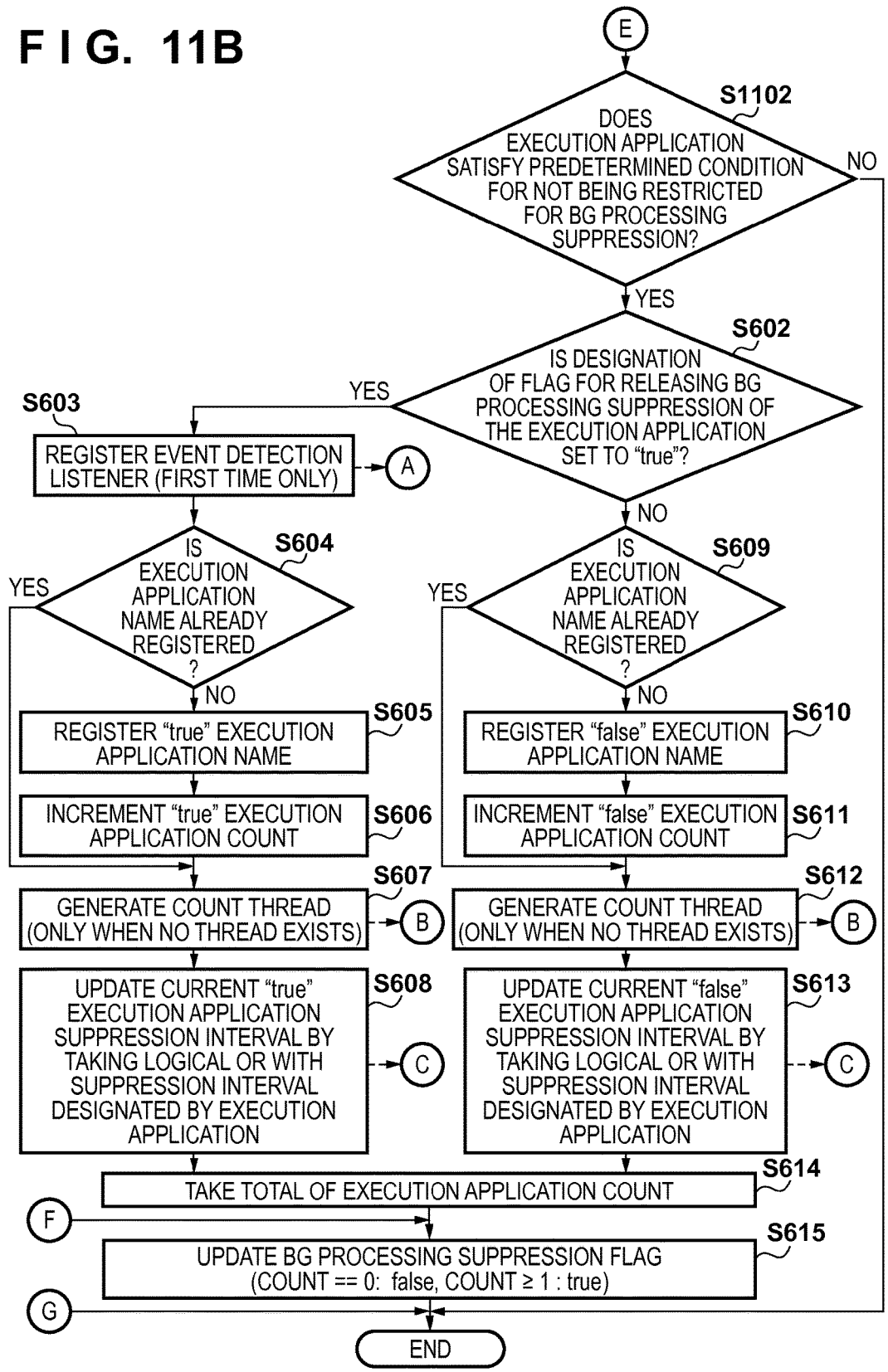

FIGS. 11A and 11B are flowcharts for internal processing of APIs for performing a control instruction for BG processing suppression and suppression release in the image processing apparatus 100 that the application PF 340 provides to applications. Note that processing of a step of a number that is the same as a step number recited in FIGS. 6A to 6C is the same processing as in FIGS. 6A to 6C. For this reason, only steps that differ to FIGS. 6A to 6C will be explained.

If the setBackgroundDisabled function is executed (reference numerals 502 and 503) (YES in step S601), the application PF 340, in step S1101, obtains information of the execution application from the application management table that the framework 350 comprises. The information that the application PF 340 obtains is the state 901, the SystemApplicationType 903, and the MinimumConsoleSize 904 which correspond to the column of the bundle 900 of the execution application.

The application PF 340, in step S1102, based on the obtained application information, determines whether or not the execution application is an application that is restricted for BG processing suppression execution. Specifically, the application PF 340 determines whether or not the state 901 of the execution application is "STARTING". Alternatively, it is determined whether or an application type discrimination the SystemApplicationType 903 is System Application/LoginService, and whether or not there is a recitation in the MinimumConsoleSize 904. That is, it is determined whether or not a predetermined condition that there is not a restriction for the execution of the BG processing suppression is satisfied.

If the execution application is an application that is not restricted for the execution of the BG processing suppression (YES in step S1102), the application PF 340 starts the processing from step S602. In a case of an application that is restricted (NO in step S1102), the application PF 340 ends the processing of the setBackgroundInhibitStatus function (reference numeral 510) without performing the processing from step S602.

In the second embodiment, by arranging a restriction for an application capable of executing the BG processing suppression API, it is possible to avoid falling into a state in which the BG processing of the image processing apparatus 100 cannot be executed for a long period due to the unnecessary execution of the BG processing suppression API.

Note that in the present embodiment, the application PF 340 uses an item in the MF which is independently extended in order to specify an application that is capable of executing the BG processing suppression API. However, while the applications comprise an item by which the application PF 340 can uniquely specify the condition as to whether the BG processing suppression can be executed, limitation is not made to this configuration. Also, the application PF 340 has as its target LUI applications, system applications, login applications, and application that are in the middle of activation processing as applications capable of executing the BG processing suppression API. However, these may include other types of applications if they are applications having processing for which the influence of a performance degradation when BG processing is executed by the image processing apparatus 100 is a concern. Also, in the condition as to whether or not there is a restriction for the execution of the BG processing suppression, conditions other than that described above may be used in accordance with the functions of the image processing apparatus, the functions of the applications, or the like.

Third Embodiment

Explanation is given for a third embodiment of the present invention. In the second embodiment, the applications that are capable of executing the BG processing suppression are limited to particular applications. However, there is the possibility of the existence of applications that are influenced by a performance degradation due to the execution of BG processing even if the application does not satisfy these conditions. For this reason, processing for when an application that does not satisfy these conditions executes the BG processing suppression API changes. Below, differences from the second embodiment are explained using FIGS. 12A and 12B.

Figure 12A:
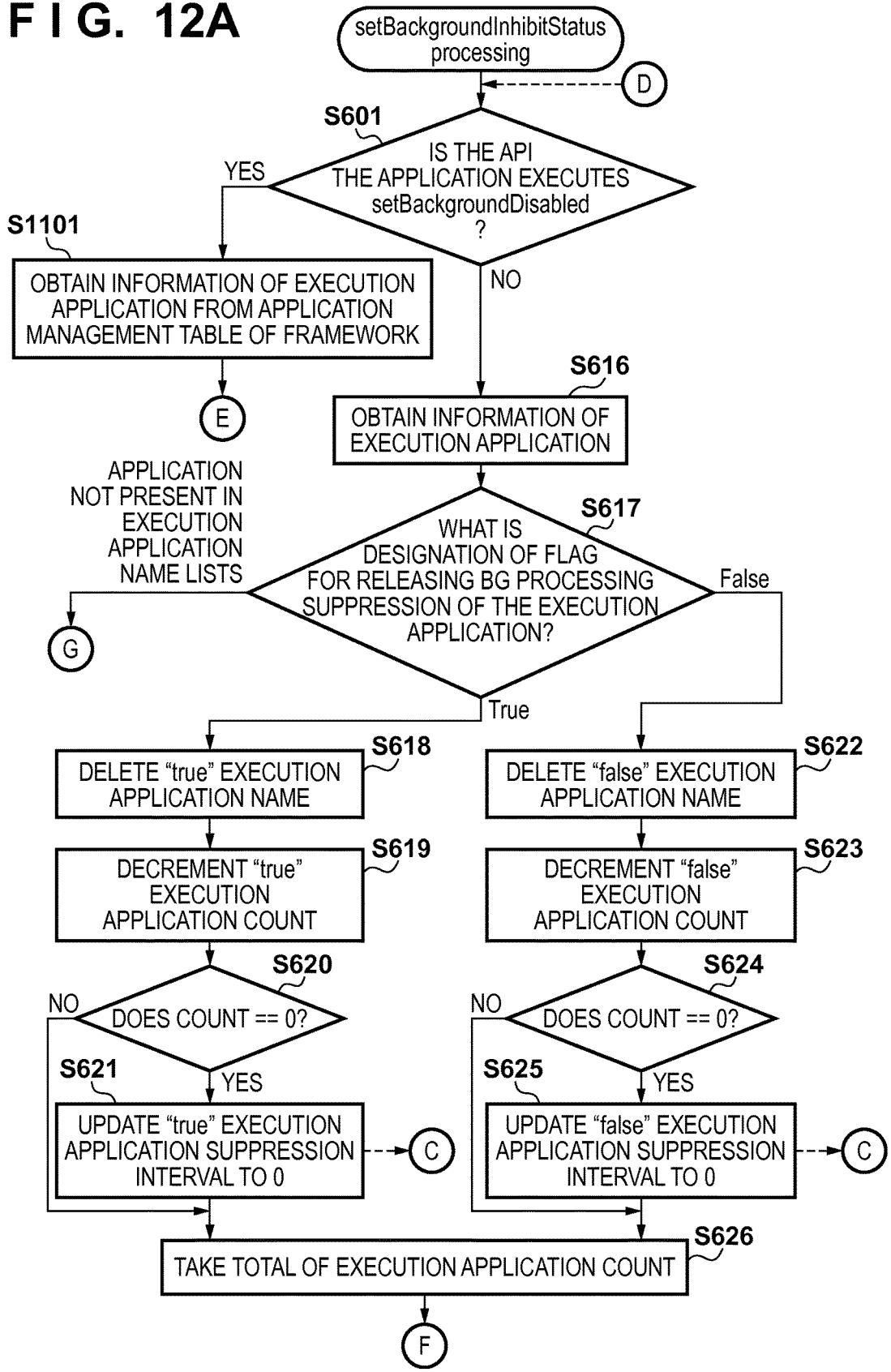

FIGS. 12A and 12B are flowcharts for internal processing of APIs for performing a control instruction for BG processing suppression and suppression release in the image processing apparatus 100 that the application PF 340 provides to applications. Note that processing of a step of a number that is the same as a step number recited in FIGS.

11A and 11B is the same processing as in FIGS. 11A and 11B. For this reason, only steps that differ to FIGS. 11A and 11B will be explained.

If the result of the determination of step S1102 is that the execution application is an application that is not restricted for the execution of the BG processing suppression (YES in step S1102), the application PF 340 starts the processing from step S602. If the application is restricted (NO in step S1102), the application PF 340 starts the processing from step S603. Specifically, the application PF 340 treats the execution of the setBackgroundDisabled function of reference numeral 503 to the BG processing suppression API that the application executed. In other words, the application PF 340 permits the application to execute the BG processing suppression API restricting to a state in which the BG processing suppression is forcibly released upon an event detection.

In the third embodiment, it is possible to avoid entering a state in which BG processing of the image processing apparatus 100 cannot be executed for a long period due to the excessive execution of the BG processing suppression from an application by changing the restrictions arranged for an application capable of executing BG processing suppression.

Additionally, the present invention is not limited to the embodiments disclosed specifically, and various variations and modifications are possible without deviating from the scope of the claims.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-235892, filed Nov. 20, 2014, which is hereby incorporated by reference herein in its entirety.

What is claimed is:

1. An information processing apparatus capable of executing processing in a background,
comprising a control unit configured to, when processing is executed in accordance with a request from an application, control execution of other processing in the background,
wherein the control unit
suppresses, in accordance with the request from the application, so that the other processing is not executed in the background, and
releases the suppression when, in a case where a request for release of suppression is not instructed from the application, a predetermined interval elapses from when the suppression started,
wherein the control unit, in a case where a preset event occurs, releases the suppression irrespective of the predetermined interval, and
wherein in the request from the application a setting of whether or not the release of the suppression is possible in the case where the event occurs in the predetermined interval is included.

2. The information processing apparatus according to claim 1, wherein the event is an event that occurs when the information processing apparatus enters a standby state.

3. The information processing apparatus according to claim 1, wherein the control unit accepts a setting of the predetermined interval from the application.

4. The information processing apparatus according to claim 3, wherein the control unit, in a case where during suppression so that processing is not executed in the background, suppression is further requested from another application different to the application, and an interval set from the application differs to an interval set from the other application, continues the suppression over the interval that ends later.

5. The information processing apparatus according to claim 4, wherein
in a case where the control unit is requested so that processing is not executed in the background from a plurality of applications, the control unit
continues the suppression in a case where a request for a release of the suppression is accepted from one of the plurality of applications, and
releases the suppression in a case where a request for a release of the suppression is accepted from all of the plurality of applications.

6. The information processing apparatus according to claim 1,
further comprising a holding unit configured to hold information of an application, wherein
the control unit, in a case where a request for suppression of processing in the background is accepted from an application, obtains the information of the application from the holding unit, and in accordance with a type of the application, switches whether or not to execute the suppression of processing in the background.

7. The information processing apparatus according to claim 6, further comprising a unit configured to accept information of an application related to execution of suppression of processing in the background which is held in the holding unit.

8. The information processing apparatus according to claim 6, wherein the control unit, in accordance with the type of the application, controls execution of either permitting or prohibiting suppression of processing in the background, or releasing suppression when in the middle of the suppression a preset event occurs.

9. A method of controlling an information processing apparatus capable of executing processing in a background, the method comprising a control step of, when processing is executed in accordance with a request from an application, controlling execution of other processing in the background, wherein in the control step suppression is performed, in accordance with the request from the application, so that the other processing is not executed in the background, and the suppression is released when, in a case where a request for release of suppression is not instructed from the application, a predetermined interval elapses from when the suppression started, wherein the control unit, in a case where a preset event occurs, releases the suppression irrespective of the predetermined interval, and wherein in the request from the application a setting of whether or not the release of the suppression is possible in the case where the event occurs in the predetermined interval is included.

10. A non-transitory computer readable medium storing a program for causing a computer to function as a control unit configured to, when processing is executed in accordance with a request from an application, control execution of other processing in a background, wherein the control unit suppresses, in accordance with the request from the application, so that the other processing is not executed in the background, and releases the suppression when, in a case where a request for release of suppression is not instructed from the application, a predetermined interval elapses from when the suppression started, wherein the control unit, in a case where a preset event occurs, releases the suppression irrespective of the predetermined interval, and wherein in the request from the application a setting of whether or not the release of the suppression is possible in the case where the event occurs in the predetermined interval is included.

* * * * *